US009656672B2

(12) United States Patent
Schieffelin

(10) Patent No.: US 9,656,672 B2
(45) Date of Patent: May 23, 2017

(54) ELECTRIC BICYCLE TRANSMISSION SYSTEMS, METHODS, AND DEVICES

(71) Applicant: CIVILIZED CYCLES INCORPORATED, Brooklyn, NY (US)

(72) Inventor: Zachary Schieffelin, Brooklyn, NY (US)

(73) Assignee: CIVILIZED CYCLES INCORPORATED, Brooklyn, NY (US)

( * ) Notice: Subject to any disclaimer, the term of this patent is extended or adjusted under 35 U.S.C. 154(b) by 0 days.

(21) Appl. No.: 15/109,105

(22) PCT Filed: Feb. 11, 2016

(86) PCT No.: PCT/US2016/017593
§ 371 (c)(1),
(2) Date: Jun. 29, 2016

(87) PCT Pub. No.: WO2016/130833
PCT Pub. Date: Aug. 18, 2016

(65) Prior Publication Data
US 2017/0106866 A1    Apr. 20, 2017

Related U.S. Application Data

(60) Provisional application No. 62/115,800, filed on Feb. 13, 2015.

(51) Int. Cl.
*B60W 10/08*    (2006.01)
*B60W 30/18*    (2012.01)
(Continued)

(52) U.S. Cl.
CPC .......... *B60W 30/181* (2013.01); *B60W 10/08* (2013.01); *B60W 10/11* (2013.01);
(Continued)

(58) Field of Classification Search
CPC .... B60W 30/181; B60W 10/11; B60W 10/08; B60W 2510/104; B60W 2520/28; B60W 2710/081; B60W 2710/1005; B62M 6/45
(Continued)

(56) References Cited

U.S. PATENT DOCUMENTS 3,540,309 A    11/1970    Shimano et al.
3,661,021 A     5/1972    Ohshita
(Continued)

FOREIGN PATENT DOCUMENTS

WO    WO 93/11992 A1    6/1993

OTHER PUBLICATIONS

International Search Report and Written Opinion for Application No. PCT/US2016/017593, mailed on May 12, 2016, in 18 pages.

*Primary Examiner* — Roger Pang
(74) *Attorney, Agent, or Firm* — Knobbe Martens Olson & Bear LLP

(57) ABSTRACT

A derailleur-based electronic transmission system for an electric bicycle comprises a wheel; a driven sprocket set coupled to the wheel via at least a first one-way clutch, the driven sprocket set comprising two or more concentric sprockets of different effective diameters; a drive chain configured to engage the driven sprocket set; an electronically controllable derailleur configured to move the drive chain among the two or more sprockets; a pedal crank configured to cause rotation of the driven sprocket set by providing a user pedal force to the driven sprocket set through at least a second one-way clutch and the drive chain; a motor configured to cause rotation of the driven sprocket set by providing an electromechanical force to the driven sprocket set through at least a the drive chain; and an electronic controller configured to, responsive to a determination that a shift should occur at a time when neither the
(Continued)

pedal crank nor the motor is causing rotation of the driven sprocket: operate the motor to rotate the driven sprocket at a rotational speed less than or equal to a current rotational speed of the wheel; and operate the derailleur to cause the shift to occur while the driven sprocket is being rotated by the motor.

20 Claims, 15 Drawing Sheets

(51) Int. Cl.
| | |
|---|---|
| B62M 9/04 | (2006.01) |
| F16D 41/24 | (2006.01) |
| B62M 6/45 | (2010.01) |
| B62M 25/08 | (2006.01) |
| B60W 10/11 | (2012.01) |
| B62J 99/00 | (2009.01) |

(52) U.S. Cl.
CPC ............. B62J 99/00 (2013.01); B62M 6/45 (2013.01); B62M 9/04 (2013.01); B62M 25/08 (2013.01); F16D 41/24 (2013.01); *B60W 2510/104* (2013.01); *B60W 2520/28* (2013.01); *B60W 2710/081* (2013.01); *B60W 2710/1005* (2013.01); *B60W 2710/1038* (2013.01); *B62J 2099/0013* (2013.01)

(58) Field of Classification Search
USPC .......................................................... 701/51
See application file for complete search history.

(56) References Cited

U.S. PATENT DOCUMENTS

| | | | |
|---|---|---|---|
| 3,772,932 | A | 11/1973 | Nagano |
| 4,869,710 | A | 9/1989 | Iwasaki |
| 5,937,964 | A | 8/1999 | Mayer et al. |
| 6,623,389 | B1 | 9/2003 | Campagnolo |
| 7,461,714 | B2 | 12/2008 | Holland |
| 8,768,585 | B2 | 7/2014 | Cheng |
| 8,886,426 | B2 | 11/2014 | Cheng |
| 2002/0025868 | A1 | 2/2002 | Fukuda |
| 2005/0087379 | A1 | 4/2005 | Holland |
| 2013/0054066 | A1* | 2/2013 | Watarai .................... B62M 6/45 701/22 |
| 2013/0054067 | A1* | 2/2013 | Shoge ...................... B62M 6/45 701/22 |
| 2015/0088389 | A1* | 3/2015 | Gao ........................ B60W 10/04 701/53 |
| 2016/0207588 | A1* | 7/2016 | Tsuchizawa ........... B62M 25/08 |
| 2016/0207589 | A1* | 7/2016 | Tsuchizawa ............. B62M 6/45 |

* cited by examiner

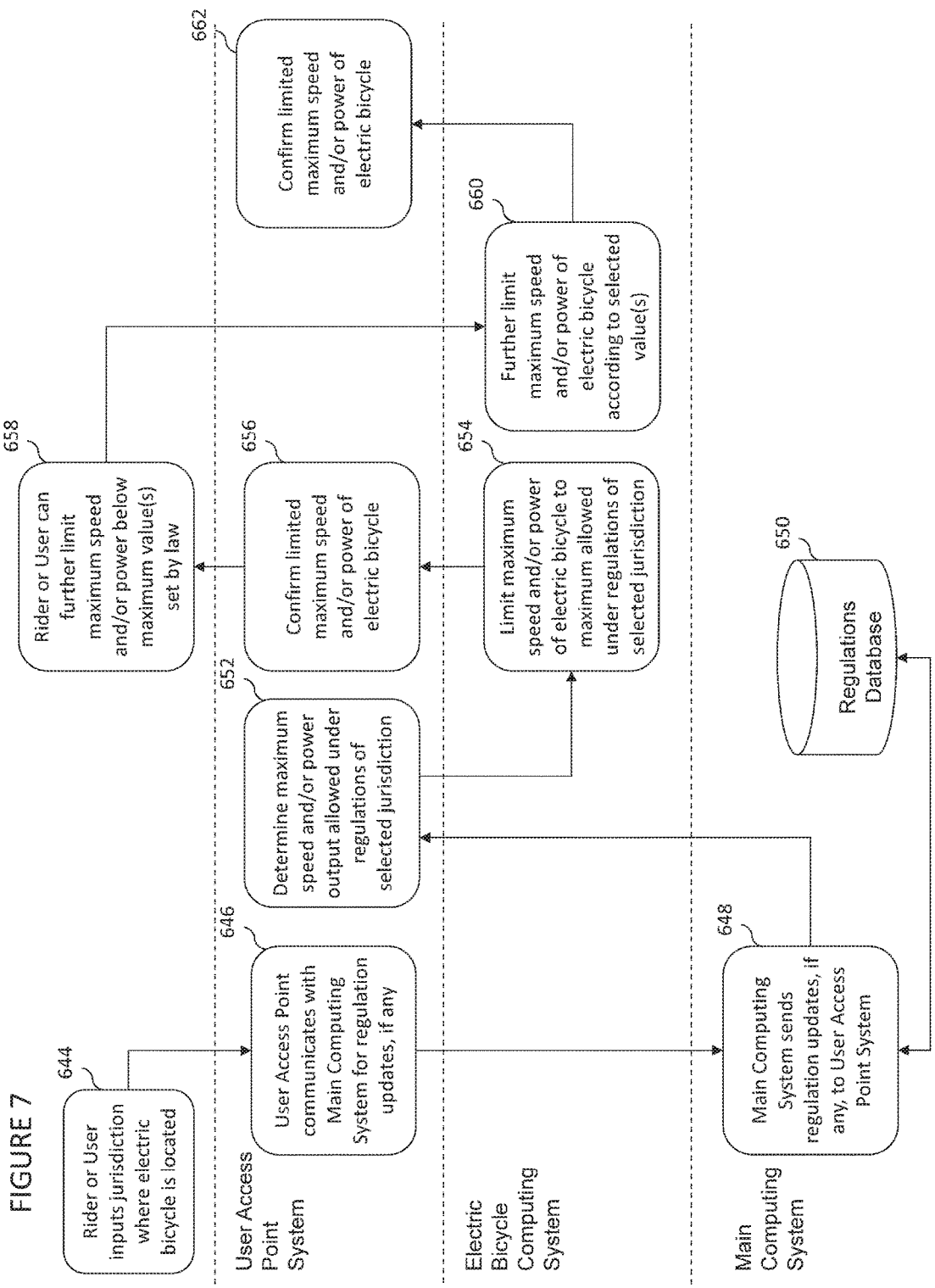

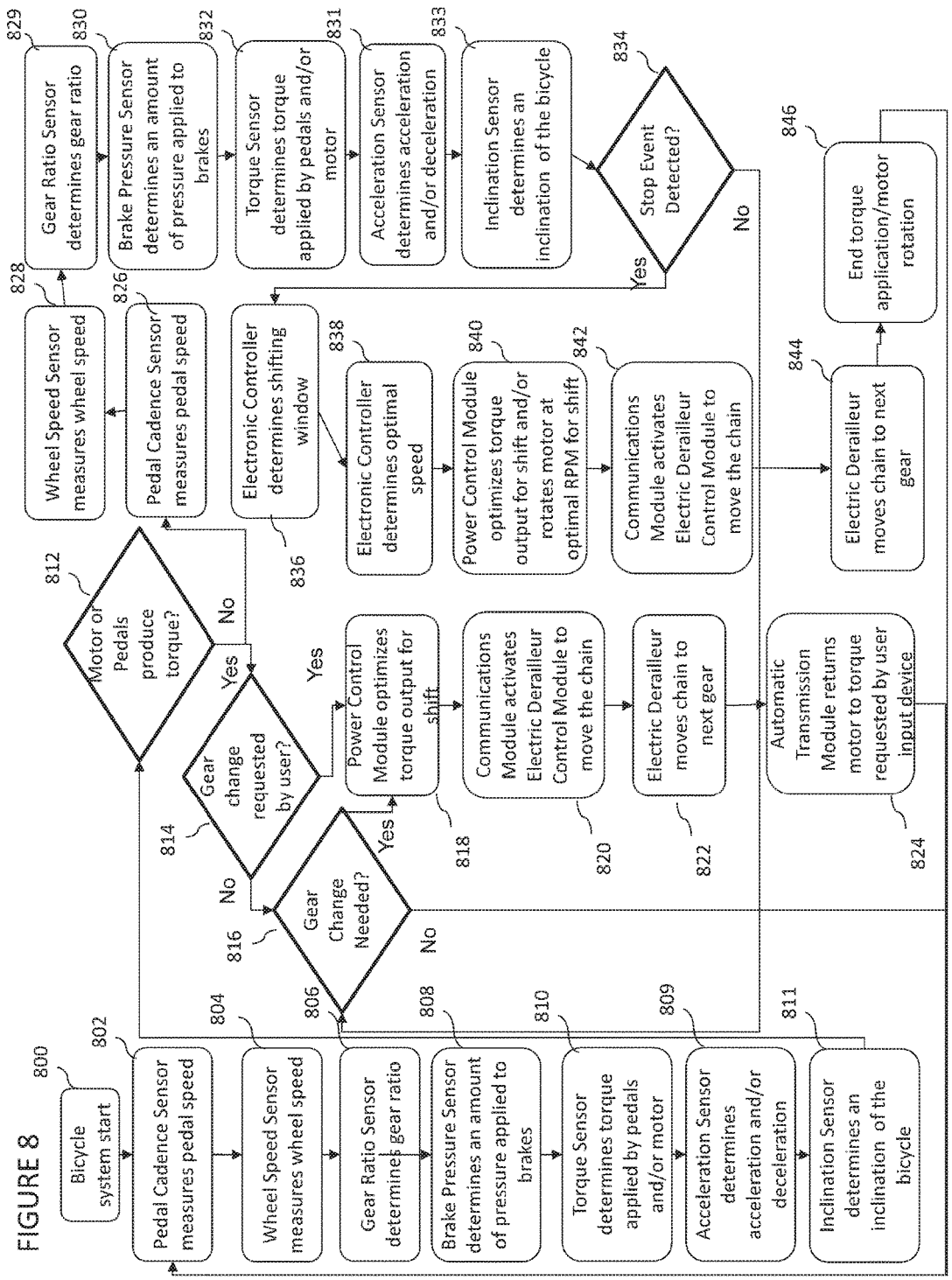

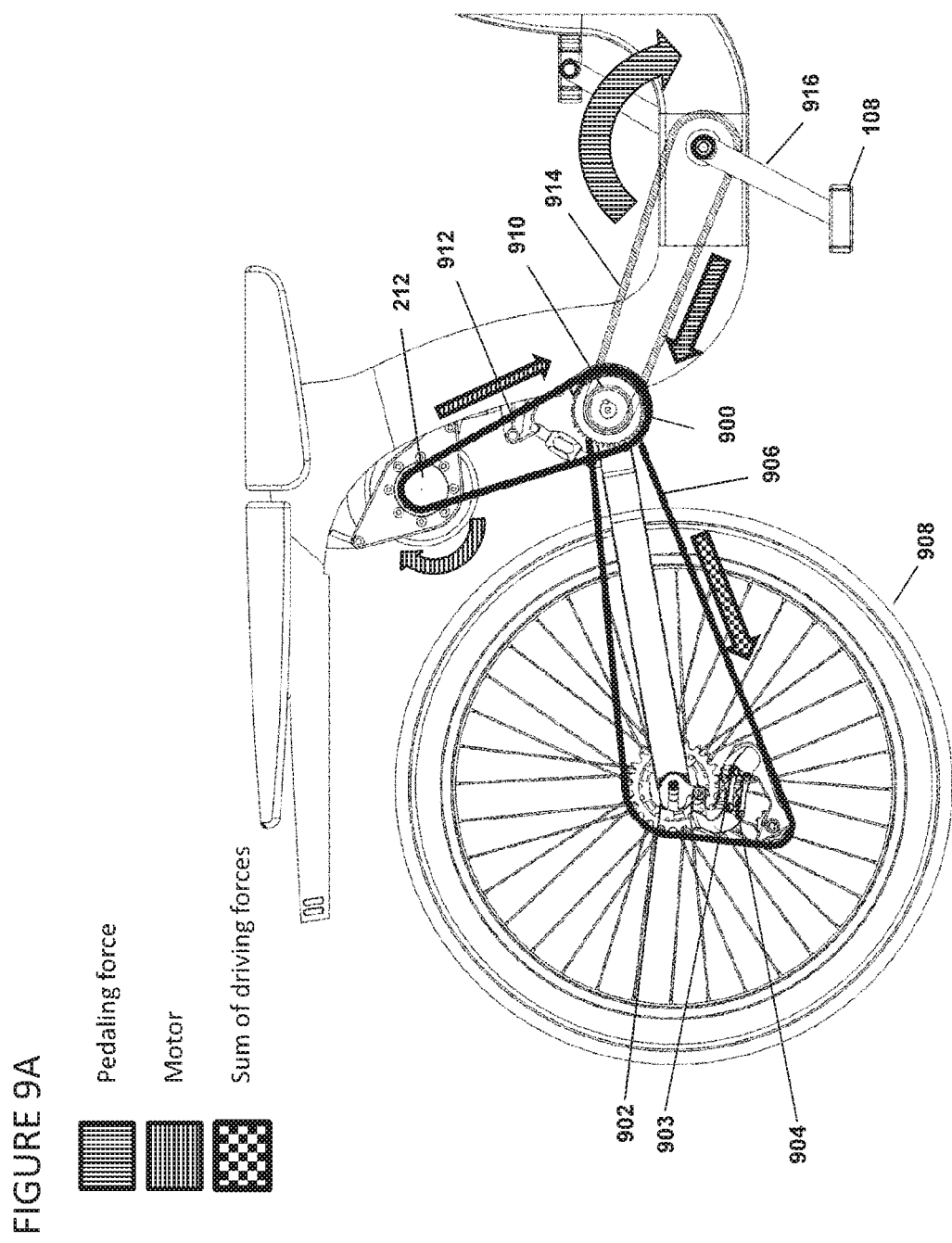

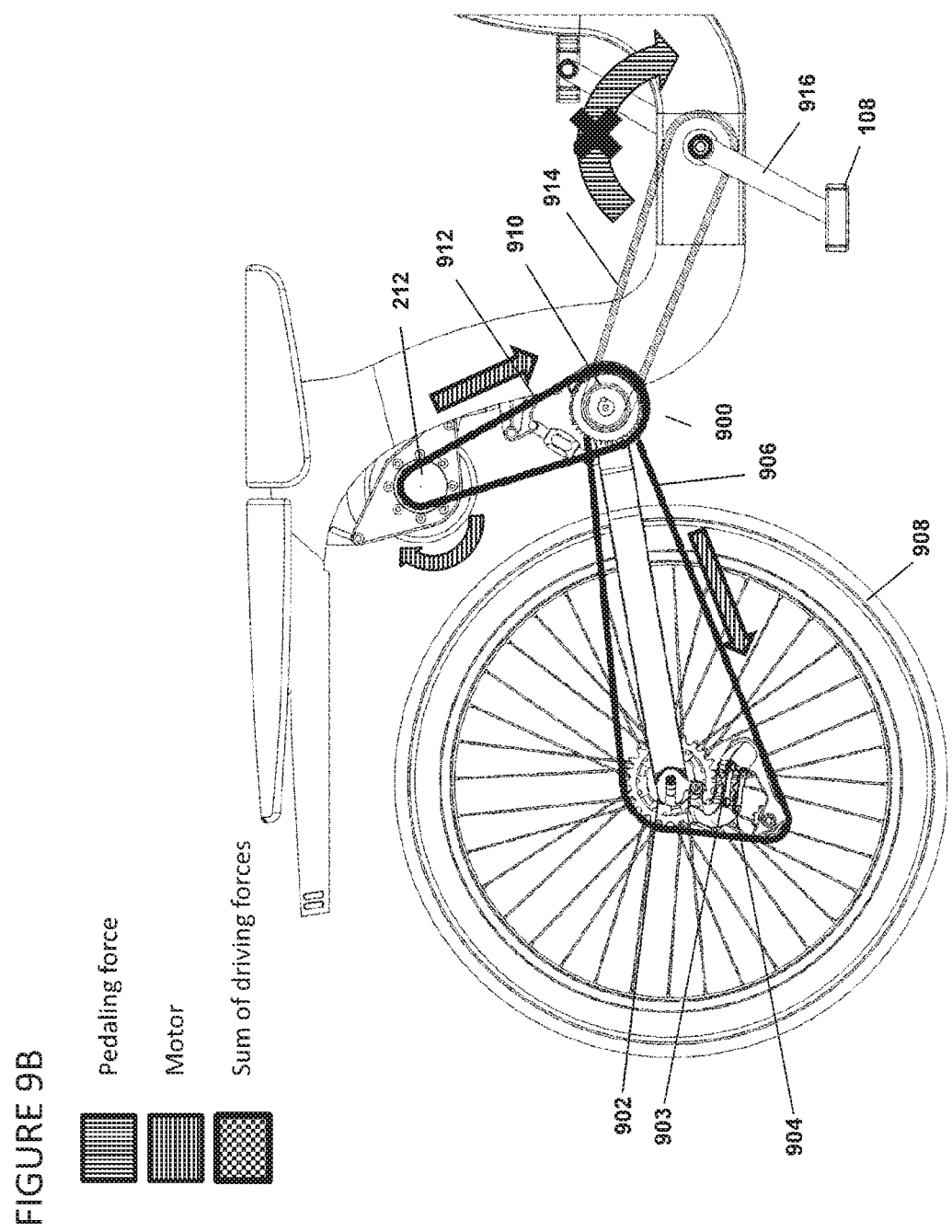

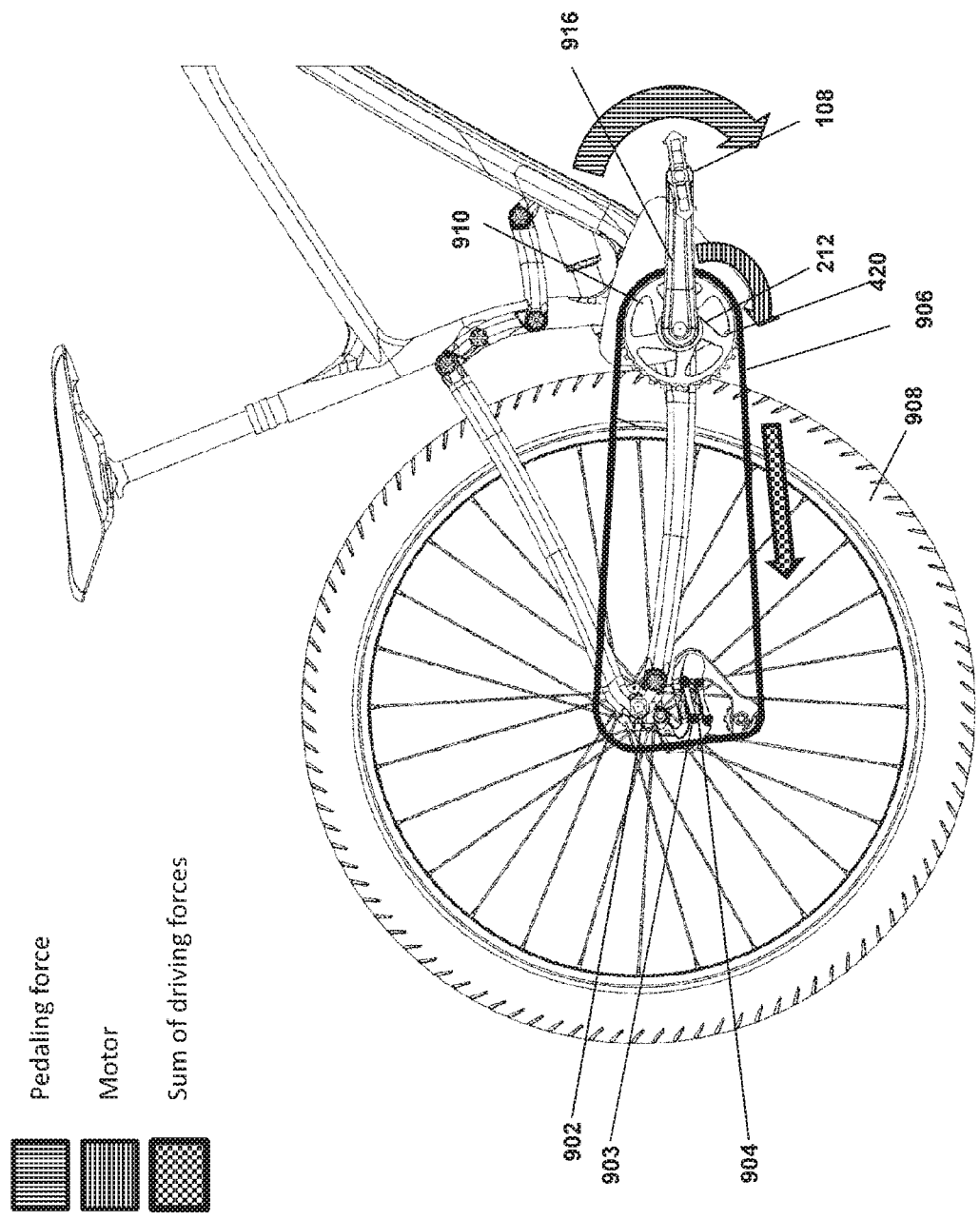

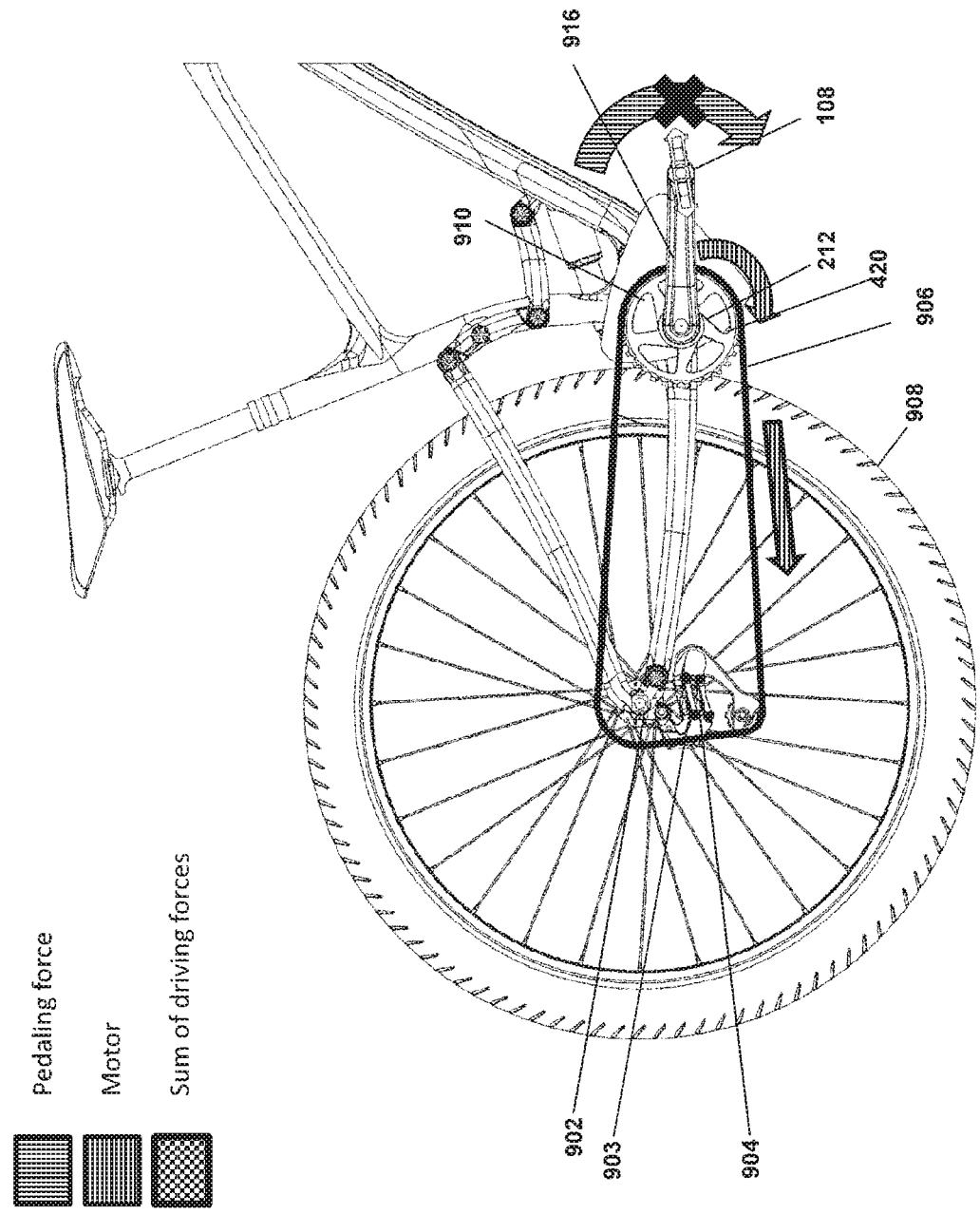

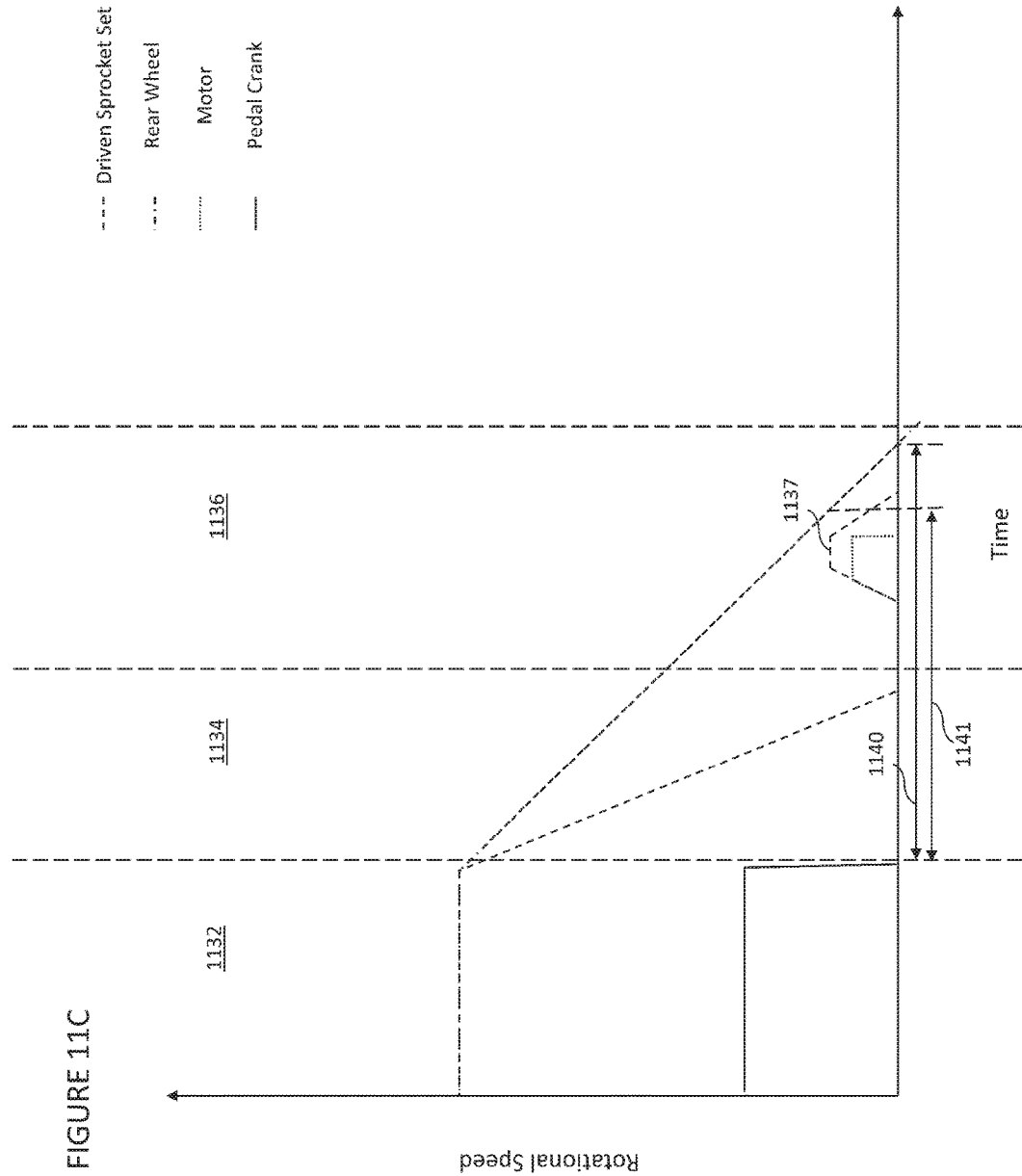

ELECTRIC BICYCLE TRANSMISSION SYSTEMS, METHODS, AND DEVICES

CROSS-REFERENCE TO RELATED APPLICATIONS

This application is a National Stage of PCT Application No. PCT/US2016/017593, titled ELECTRIC BICYCLE TRANSMISSION SYSTEMS, METHODS, AND DEVICES, filed Feb. 11, 2016, which claims the benefit of U.S. Provisional Patent Application No. 62/115,800, titled ELECTRIC BICYCLE TRANSMISSION SYSTEMS, METHODS, AND DEVICES, filed Feb. 13, 2015. Each of the foregoing applications is hereby incorporated by reference herein in its entirety.

BACKGROUND

Field

Embodiments relate to the field of bicycles, and, in particular, to transmissions for electric bicycles.

Description

Bicycles enable a rider to transport himself or herself over a riding surface by converting a pedaling motion of the rider's legs into rotational motion of a drive wheel of the bicycle. One challenge with bicycles is that it can be easier or harder to pedal the bicycle depending on various factors, such as speed, inclination, rider ability, and the like. To enable easier pedaling and/or to make riding a bicycle more efficient, various devices have been developed to enable selectively changing a gear ratio between a pedal crank and the drive wheel. Two examples of such devices are a derailleur and an internally geared hub. With a derailleur, a driven sprocket set coupled to a wheel comprises a plurality of concentric sprockets of different sizes that a drive chain can move among. With an internally geared hub, a drive chain engages a single sprocket coupled to the hub, and gears within the hub enable changing of the gear ratio.

Further, with the development of new technologies, various types and kinds of electric bicycles are available today that can operate on electric and/or manual power. Many different types of electric bicycles are available and comprise various types of parts, such as motors and batteries, customized for different laws and regulations of each jurisdiction. Most electric bicycles are quite particular and lack compatibility or flexibility. For example, a certain electric bicycle can be restricted to be used in conjunction with certain parts, certain configurations, and/or within certain jurisdictions only. In other words, the electric bicycle industry lacks any standard or base model that can easily be adapted to accommodate different regulations, different parts, and/or different configurations. Further, the same electric bicycle may be considered by law a bicycle, a moped, a motor assisted cycle, or a motorcycle depending on jurisdiction and specification. The most common jurisdictional variations are total power permitted, top speed permitted, and whether the motor is controlled by a hand throttle or by pedal input.

SUMMARY

Advances in technology make it possible for an electric bicycle to comprise an automatic transmission system that can be configured to automatically select and/or shift to an optimal gear for current operating conditions, regardless of user behavior, and in situations when it would be difficult or impossible for a user to manually perform a shift. In some embodiments, an electronically controllable derailleur-based bicycle transmission enables automatic downshifting during a fast stop event, even when the pedal crank is not rotating and/or when no torque is being transferred from the pedal crank and/or motor to the drive wheel. Further, advancements in technology make it possible to develop systems of a versatile electric bicycle that are adaptable to accommodate different parts, including motors and batteries, seat configurations, and laws of different jurisdictions.

According to some embodiments, a derailleur-based electronic transmission system for an electric bicycle comprises a wheel; a driven sprocket set coupled to the wheel via at least a first one-way clutch, the driven sprocket set comprising two or more concentric sprockets of different effective diameters; a drive chain configured to engage the driven sprocket set; an electronically controllable derailleur configured to move the drive chain among the two or more sprockets; a pedal crank configured to cause rotation of the driven sprocket set by providing a user pedal force to the driven sprocket set through at least a second one-way clutch and the drive chain; a motor configured to cause rotation of the driven sprocket set by providing an electromechanical force to the driven sprocket set through at least a the drive chain; and an electronic controller configured to, responsive to a determination that a shift should occur at a time when neither the pedal crank nor the motor is causing rotation of the driven sprocket: operate the motor to rotate the driven sprocket at a rotational speed less than or equal to a current rotational speed of the wheel; and operate the derailleur to cause the shift to occur while the driven sprocket is being rotated by the motor.

In some embodiments, the motor is further configured to provide the electromechanical force to the driven sprocket set through at least a third one-way clutch and the drive chain. In some embodiments, the electronic controller can be configured to determine that the shift should occur by determining that a stop event is occurring. Determining that the stop event is occurring may comprise monitoring, directly and/or indirectly, one or more of the following: a rotational speed of the wheel, a rotational speed of the pedal crank, a rate of deceleration of the rotational speed of the wheel, a braking force, a rate of translational deceleration, a pedal cadence. In some embodiments, the electronic controller can be configured to estimate a remaining amount of revolutions of the wheel before the stop event completes and operate the motor to rotate the driven sprocket at a rotational speed less than or equal to the current rotational speed of the wheel, but sufficiently fast to complete the shift within the estimated remaining amount of revolutions of the wheel.

In some embodiments, the derailleur-based electronic transmission system further comprises a jackshaft configured to transfer the user pedal force and electromechanical force to the driven sprocket through at least the drive chain, wherein the pedal crank and motor are each connected to the jackshaft through a separate chain or belt different than the drive chain. The second one-way clutch can be located functionally between the pedal crank and the jackshaft. The third one-way clutch can be located functionally between the motor and the jackshaft.

In some embodiments, the derailleur-based electronic transmission system further comprises the motor, pedal crank, and driven sprocket are arranged in a mid-drive arrangement.

In some embodiments, the electronic controller can be further configured to determine that the shift should occur by monitoring a current speed of the bicycle and determining that, based on the current speed of the bicycle, a more efficient gear is available than a present gear. In some embodiments, the electronic controller can be configured to determine that the shift should occur by receiving a user request to perform a shift.

In some embodiments, the electronic controller is further configured to monitor the rotational speed of the wheel as the shift is occurring; and adjust the operation of the motor, responsive to a determination that the rotational speed of the wheel has changed, to increase or decrease the rotational speed of the driven sprocket to maintain the rotational speed of the driven sprocket at a speed less than or equal to the rotational speed of the wheel. In some embodiments, the electronic controller is configured to maintain the rotational speed of the driven sprocket to within 5% of the monitored rotational speed of the wheel as the shift is occurring.

According to some embodiments, a derailleur-based electronic transmission system for an electric bicycle operates automatically by determining, by an electric bicycle controller, that a stop event is occurring; determining, by the electric bicycle controller, that a downshift is desirable before the stop event completes; measuring, directly or indirectly, a rotational sprocket set speed and determining that the rotational sprocket set speed is below a threshold speed for effecting the downshift before the stop event completes, the sprocket set comprising two or more concentric sprockets; operating, by the electric bicycle controller, a motor to cause rotation of the sprocket set at a speed equal to or greater than the threshold speed, but equal to or less than a rotational speed of a wheel coupled to the sprocket set; and operating, by the electric bicycle controller, an electronic derailleur to cause the electronic derailleur to shift a chain from a first sprocket of the two or more concentric sprockets to a different sprocket of the two or more concentric sprockets while the motor is causing the sprocket set to rotate.

In some embodiments, determining that the stop event is occurring comprises monitoring, directly or indirectly, by one or more sensors, one or more of the following bicycle conditions: a rotational speed of the wheel, a rotational speed of a pedal crank, a rate of deceleration of the rotational speed of the wheel, a braking force, a rate of translational deceleration, a pedal cadence. Determining that the stop event is occurring may further comprise determining that the rate of deceleration of the rotational speed of the wheel is equal to or greater than a threshold rate of deceleration. In one embodiment, the threshold rate of deceleration is at least 0.5 meters/sec/sec. In one embodiment, the threshold rate of deceleration is at least 1 meters/sec/sec. In one embodiment, the threshold rate of deceleration is at least 1.5 meters/sec/sec. In one embodiment, the threshold rate of deceleration is at least 2 meters/sec/sec. In one embodiment, the threshold rate of deceleration is at least 2.5 meters/sec/sec.

In some embodiments, determining that the downshift is desirable before the stop event completes comprises determining that a current gear range is different than an optimum starting gear range, and wherein causing the electronic derailleur to shift the chain to the different sprocket results in engaging the optimum starting gear range. In an embodiment, the optimum starting gear range may be based at least partially on a user-defined preference. In some embodiments, the optimum starting gear range is dynamically determined in real time based at least partially on a current inclination of the bicycle.

In some embodiments, determining that the rotational sprocket set speed is below the threshold speed comprises determining that rotational sprocket set speed is zero. In some embodiments the derailleur-based electronic transmission system for an electric bicycle further operates automatically by calculating the threshold speed for effecting the downshift before the stop event completes, detecting a current gear status; determining an amount of sprocket set rotation required to effect a shift from the current gear to an optimum starting gear; and calculating a minimum sprocket set rotational speed required to effect the required amount of sprocket set rotation before the stop event completes. In some embodiments, calculating the threshold speed further comprises determining an optimum gear change sprocket set speed range; and responsive to determining that the minimum sprocket set rotational speed required to effect the required amount of sprocket set rotation before the stop event completes is below the optimum gear change sprocket set speed range, setting the threshold speed to be at least as fast as a bottom end of the optimum gear change sprocket set speed range. In some embodiments, calculating the threshold speed further comprises including a margin to account for a possibility that a rate of deceleration of the wheel may increase.

In some embodiments, the derailleur-based electronic transmission system for an electric bicycle further operates automatically by continually monitoring, directly and/or indirectly, the rotational speed of the wheel during the shift of the chain; and reducing the rotational speed of the sprocket set as needed, during the shift of the chain, to maintain the rotational speed of the sprocket set equal to or less than the rotational speed of the wheel.

In some embodiments, the wheel is coupled to the sprocket set by at least a one-way freewheel clutch that automatically rotationally decouples the wheel from the sprocket set when the sprocket set is rotating at a rotational velocity less than a rotational velocity of the wheel. In some embodiments, the wheel is coupled to sprocket set by at least an active clutch that selectively enables the sprocket set to rotate at a rotational velocity greater than a rotational velocity of the wheel to allow the electronic derailleur to shift the chain while the bicycle is stopped or while the wheel is rotating at a velocity slower than desired to effect a shift.

In some embodiments, the electric bicycle comprises a jackshaft configuration comprising a jackshaft configured to connect to the motor by a first power transmission component, to connect to the sprocket set by a second power transmission component, and to connect to pedal gears by a third power transmission component. In some embodiments, the motor is a mid-drive motor.

In some embodiments, determining the stop event is occurring comprises measuring a brake pressure to determine an application of the brake pressure. In some embodiments, the derailleur-based electronic transmission system for an electric bicycle further operates automatically by measuring a plurality of bicycle statistics by a plurality of sensors and calculating an optimal shifting window comprising calculating a rate of deceleration based on the plurality of bicycle statistics. In an embodiment, calculating the optimal shifting window further comprises determining the optimal gear change speed within the optimal shifting window to effect a shift in gears. In an embodiment, calculating the optimal shifting window further comprises determining an optimal degree of rotation of the sprocket set to effect a shift in gears.

In some embodiments, a derailleur-based electronic transmission system for an electric bicycle comprises a wheel; a driven sprocket set coupled to the wheel, the driven sprocket set comprising two or more concentric sprockets of different effective diameters; a drive mechanism configured to engage the driven sprocket set; an electronically controllable derailleur configured to move the drive mechanism among the two or more sprockets; a pedal crank configured to cause rotation of the driven sprocket set by providing a user pedal force to the driven sprocket set; a motor configured to cause rotation of the driven sprocket set by providing an electromechanical force to the driven sprocket set; and an electronic controller configured to, responsive to a determination that a shift should occur at a time when neither the pedal crank nor the motor is causing rotation of the driven sprocket: operate the motor to rotate the driven sprocket at a rotational speed less than or equal to a current rotational speed of the wheel; and operate the derailleur to cause the shift to occur while the driven sprocket is being rotated by the motor.

In some embodiments, a derailleur-based electronic transmission system for an electric bicycle comprises a wheel; a driven sprocket set coupled to the wheel via at least a first clutch, the driven sprocket set comprising two or more concentric sprockets of different effective diameters; a drive mechanism configured to engage the driven sprocket set; an electronically controllable derailleur configured to move the drive mechanism among the two or more sprockets; a pedal crank configured to cause rotation of the driven sprocket set by providing a user pedal force to the driven sprocket set through at least a second clutch and the drive mechanism; a motor configured to cause rotation of the driven sprocket set by providing an electromechanical force to the driven sprocket set through at least a third clutch and the drive mechanism; and an electronic controller configured to, responsive to a determination that a shift should occur at a time when neither the pedal crank nor the motor is causing rotation of the driven sprocket: operate the motor to rotate the driven sprocket at a rotational speed less than or equal to a current rotational speed of the wheel; and operate the derailleur to cause the shift to occur while the driven sprocket is being rotated by the motor.

In some embodiments, a derailleur-based electronic transmission system for an electric bicycle comprises an electronic controller configured to, responsive to a determination that a shift should occur at a time when neither a pedal crank nor a motor is causing rotation of a driven sprocket: operate the motor to rotate the driven sprocket at a rotational speed less than or equal to a current rotational speed of a wheel; and operate a derailleur to cause the shift to occur while the driven sprocket is being rotated by the motor.

In some embodiments, a computer-readable, non-transitory storage medium having a computer program stored thereon for causing a suitably programmed computer system to process by one or more processors computer-program code by performing a method for automatically operating a derailleur-based transmission of an electric bicycle when the computer program is executed on the suitably programmed computer system, the method comprising: determining, using a computer system, that a stop event is occurring; determining, by the computer system, that a downshift is desirable before the stop event completes; measuring, directly or indirectly, a rotational sprocket set speed and determining that the rotational sprocket set speed is below a threshold speed for effecting the downshift before the stop event completes, the sprocket set comprising two or more concentric sprockets; operating, using the computer system, a motor to cause rotation of the sprocket set at a speed equal to or greater than the threshold speed, but equal to or less than a rotational speed of a wheel coupled to the sprocket set; and operating, using the computer system, an electronic derailleur to cause the electronic derailleur to shift a chain from a first sprocket of the two or more concentric sprockets to a different sprocket of the two or more concentric sprockets while the motor is causing the sprocket set to rotate; wherein the computer system comprises a computer processor and electronic memory.

In some embodiments, the computer-readable, non-transitory storage medium determines that the stop event is occurring by monitoring, directly or indirectly, by one or more sensors, one or more of the following bicycle conditions: a rotational speed of the wheel, a rotational speed of a pedal crank, a rate of deceleration of the rotational speed of the wheel, a braking force, a rate of translational deceleration, a pedal cadence. In some embodiments, the computer-readable, non-transitory storage medium further determines that the stop event is occurring by determining that the rate of deceleration of the rotational speed of the wheel is less than a threshold rate of deceleration. In some embodiments, the threshold rate of deceleration is at least 0.5 meters/sec/sec. In some embodiments, the threshold rate of deceleration is at least 1 meters/sec/sec. In some embodiments, the threshold rate of deceleration is at least 1.5 meters/sec/sec. In some embodiments, the threshold rate of deceleration is at least 2 meters/sec/sec. In some embodiments, the threshold rate of deceleration is at least 2.5 meters/sec/sec.

In some embodiments, the computer-readable, non-transitory storage medium determines that the downshift is desirable before the stop event completes by determining that a current gear range is different than an optimum starting gear range, and causing the electronic derailleur to shift the chain to the different sprocket results in engaging the optimum starting gear range. In some embodiments, the optimum starting gear range is based at least partially on a user-defined preference. In some embodiments, the optimum starting gear range is dynamically determined in real time based at least partially on a current inclination of the bicycle. In some embodiments, the computer-readable, non-transitory storage medium determines that the rotational sprocket set speed is below the threshold speed comprises by determining that rotational sprocket set speed is zero. In some embodiments, the computer-readable, non-transitory storage medium further comprises calculating the threshold speed for effecting the downshift before the stop event completes, the calculating comprising: detecting a current gear status; determining an amount of sprocket set rotation required to effect a shift from the current gear to an optimum starting gear; and calculating a minimum sprocket set rotational speed required to effect the required amount of sprocket set rotation before the stop event completes.

In some embodiments, the computer-readable, non-transitory storage medium further calculates the threshold speed by: determining an optimum gear change sprocket set speed range; and responsive to determining that the minimum sprocket set rotational speed required to effect the required amount of sprocket set rotation before the stop event completes is below the optimum gear change sprocket set speed range, setting the threshold speed to be at least as fast as a bottom end of the optimum gear change sprocket set speed range. In some embodiments, the computer-readable, non-transitory storage medium calculates the threshold speed further comprises including a margin to account for a possibility that a rate of deceleration of the wheel may increase. In some embodiments, the computer-readable, non-transitory storage medium further comprises continually monitoring, directly and/or indirectly, the rotational speed of the wheel during the shift of the chain; and reducing the rotational speed of the sprocket set as needed, during the shift of the chain, to maintain the rotational speed of the sprocket set equal to or less than the rotational speed of the wheel.

In some embodiments, the wheel is coupled to the sprocket set by at least a one-way freewheel clutch that automatically rotationally decouples the wheel from the sprocket set when the sprocket set is rotating at a rotational velocity less than a rotational velocity of the wheel. In some embodiments, the wheel is coupled to sprocket set by at least an active clutch that selectively enables the sprocket set to rotate at a rotational velocity greater than a rotational velocity of the wheel to allow the electronic derailleur to shift the chain while the bicycle is stopped or while the wheel is rotating at a velocity slower than desired to effect a shift. In some embodiments, the electric bicycle comprises a jackshaft configuration, the jackshaft configuration comprising a jackshaft configured to connect to the motor by a first power transmission component, to connect to the sprocket set by a second power transmission component, and to connect to pedal gears by a third power transmission component.

In some embodiments, the motor is a mid-drive motor. In some embodiments, determining the stop event is occurring comprises measuring a brake pressure to determine an application of the brake pressure. In some embodiments, the computer-readable, non-transitory storage medium further comprises measuring a plurality of bicycle statistics by a plurality of sensors and calculating an optimal shifting window, the calculating an optimal shifting window comprising calculating a rate of deceleration based on the plurality of bicycle statistics. In some embodiments, the computer-readable, non-transitory storage medium further calculates the optimal shifting window by determining the optimal gear change speed within the optimal shifting window to effect a shift in gears. In some embodiments, the computer-readable, non-transitory storage medium further calculates the optimal shifting window by determining an optimal degree of rotation of the sprocket set to effect a shift in gears.

According to some embodiments, an automatic transmission system for an electric bicycle comprises a driven sprocket set comprising two or more concentric sprockets of different effective diameters; an electronically controllable derailleur configured to move a chain among the two or more sprockets; a pedal crank configured to provide a user force to the driven sprocket set; an active clutch configured to selectively decouple the pedal crank from the driven sprocket set or a one-way freewheel clutch configured to allow rotation of the wheels without rotation of the pedal crank; a motor configured to provide an electromechanical force to the driven sprocket set; and an electronic controller configured to cause a decoupling of the pedal crank from the driven sprocket set, using the clutch, the controller further configured to operate the motor to rotate the driven sprocket set at a shifting speed, and to operate the derailleur to cause a shift to occur while the driven sprocket is rotating at the shifting speed, wherein the shifting speed is different than a speed at which the sprocket set would rotate if the pedal crank were not decoupled.

In some embodiments, the at least one user input device comprises at least one pedal crank. In some embodiments, the user input device comprises at least one motor and at least one pedal crank. In some embodiments, the optimal gear change speed is higher than the sprocket set speed. In some embodiments, operating the motor to adjust the sprocket set speed further comprises operating the motor to effect the gear change by increasing the sprocket speed to obtain the optimal gear change speed. In some embodiments, the optimal gear change speed is lower than the sprocket set speed. In some embodiments, operating the motor to adjust the sprocket set speed further comprises operating the motor to apply a breaking force to effect a gear change by lowering the sprocket speed to the optimal gear change speed. In some embodiments, the plurality of bicycle statistics further comprises a pedal cadence. In some embodiments, the plurality of bicycle statistics further comprises a wheel speed. In some embodiments, the plurality of bicycle statistics further comprises the sprocket set speed.

According to some embodiments, an automatic transmission system for an electric bicycle comprises: a sprocket set comprising two or more concentric sprockets of different effective diameters; at least one user input device configured to rotate the sprocket set; a plurality of sensors configured to measure a plurality of bicycle statistics, wherein the plurality of bicycle statistics comprises at least a torque production of at least one user input device; an electronic controller, the electronic controller configured to determine based on the torque production that the at least one user input device is not producing a torque, wherein the electronic controller is further configured to calculate an optimal gear change speed based on the plurality of bicycle statistics, wherein the electronic controller is further configured to compare the optimal gear change to a sprocket set speed, wherein the electronic controller is further configured to determine based on the comparison that the optimal gear change speed is different than the sprocket set speed; a motor configured to adjust the sprocket set speed to obtain the optimal gear change speed; a clutch actuator configured to decouple the at least one user input device from the sprocket set; an electronic derailleur configured to shift a chain from a first sprocket of the two or more concentric sprockets to a different sprocket of the two or more concentric sprockets while the sprocket set is rotating at the optimal gear change speed.

According to some embodiments, a non-transitory computer storage comprises a storage medium, said non-transitory computer storage having stored thereon a computer program that instructs an electronic controller to determine based on a measured torque production that at least one user input device is not producing a torque; calculate an optimal gear change speed based on a plurality of bicycle statistics measured by a plurality of sensors; compare the optimal gear change to a measured sprocket set speed; determine that the optimal gear change speed is different than the sprocket set speed; communicate with a clutch actuator to decouple the at least one user input device from a sprocket set, wherein the sprocket comprises two or more concentric sprockets of different effective diameters; operate a motor to adjust the sprocket set speed to obtain the optimal gear change speed; and communicate with an electronic derailleur to shift a chain from a first sprocket of the two or more concentric sprockets to a different sprocket of the two or more concentric sprockets while the sprocket set is rotating at the optimal gear change speed.

In one embodiment, a system for controlling an electric bicycle having a motor comprises a user access point unit configured to receive a user input for controlling the electric bicycle, and an electric bicycle computing unit configured to control performance characteristics of the electric bicycle. The electric bicycle computing unit may control the electric bicycle based on the received user input, such that the performance characteristics of the electric bicycle comply with regulations of a first jurisdiction encompassing a current location of the electric bicycle. In one embodiment, the electric bicycle computing unit may communicate with a main computing system which maintains a regulations database to retrieve the regulations of the first jurisdiction encompassing the current location of the electric bicycle and automatically configure the electric bicycle to comply with the retrieved regulations. In another embodiment, the user access point unit may communicate with a main computing system which maintains a regulations database to retrieve the regulations of the first jurisdiction encompassing the current location of the electric bicycle and transmit the retrieved regulations to the electric bicycle computing unit, and electric bicycle computing unit may automatically configure the electric bicycle to comply with the regulations transmitted by the user access point unit.

In some embodiments, the current location of the electric bicycle may be automatically determined, without any user input, based on location information provided by a GPS module configured to determine location information. Alternatively, in other embodiments, the current location of the electric bicycle may be determined based on the user input specifying a location.

In some embodiments, the user access point unit may allow the user to specify one or more control parameters for controlling the electric bicycle. The one or more control parameters may be one or more of (i) pedal assist or power on demand modes of power application, (ii) a power output of the motor, (iii) a top speed of the electric bicycle, (iv) a maximum torque of the motor, and (v) a brake ON or OFF status.

In some embodiments, the electric bicycle computing unit may detect a change in the current location of the electric bicycle causing the current location to be encompassed by a second jurisdiction different from the first jurisdiction, and automatically configure the electric bicycle to comply with regulations of the second jurisdiction In some embodiments, the electric bicycle may further comprise power control module for controlling the power output of the motor of the electric bicycle, a GPS module for detecting a current location of the electric bicycle, a speed detection module for detecting a current speed of the electric bicycle, a navigation module for providing directions to the user, and/or a battery level detection module for monitoring a current battery level by communicating with one or more battery sensors.

In some embodiments, the user input may include user selection of a riding mode specifying how the electric bicycle is to be used. Based on the user selection, the electric bicycle computing unit may control the electric bicycle according to the selected riding mode. For example, (1) in a case that the riding mode is a bicycle mode, the electric bicycle computing unit turns off the motor of the electric bicycle such that the electric bicycle is driven solely by pedaling, (2) in a case that the riding mode is a moped mode, the electric bicycle computing unit caps the performance of the motor of the electric bicycle based on the regulations of the first jurisdiction, and (3) in a case that the riding mode is an off-road-only mode, the electric bicycle computing unit allows the motor of the electric bicycle to perform in an uninhibited manner.

In some embodiments, the electric bicycle computing unit may be configured to unlock the electric bicycle when a valid connection is established between the electric bicycle computing unit, and lock the electric bicycle when the valid connection is terminated.

In some embodiments, an electric bicycle may comprise a frame and a side bag having a semi-rigid outer shell. The side bag may be connected to the frame with an elastic material that holds the shell tight to the frame when the side bag is not full and holds the shell tight to the cargo inside the side bag when the side bag is full.

In some embodiments, the side bag is waterproof, cut resistant, permanently fixed to the frame, and/or has one or more additional pockets for holding batteries, controllers, bicycle locks and/or helmets. In some embodiments, a bag or compartment for holding one or more batteries may comprise a connector mechanism for connecting at least one battery of said one or more batteries to the electric bicycle such that the motor is powered by said at least one battery.

BRIEF DESCRIPTION OF THE DRAWINGS

The foregoing and other features, aspects and advantages are described in detail below with reference to the drawings of various embodiments, which are intended to illustrate and not to limit the disclosure. The drawings comprise the following figures in which:

FIG. 7 is an embodiment of a process flow diagram illustrating an example embodiment of a method of controlling the maximum output of a motor of an electric bicycle.

FIG. 8 is an embodiment of a process flow diagram illustrating an example method of controlling an automatic transmission system.

FIGS. 9A-9B depict an embodiment of an electric bicycle with a jackshaft design configuration and a derailleur.

FIGS. 10A-10B depict an embodiment of an electric bicycle with a mid-drive motor configuration and a derailleur.

FIGS. 11A-11C are line graphs depicting embodiments of methods for controlling an automatic transmission system of an electric bicycle.

DETAILED DESCRIPTION

Figure 1:
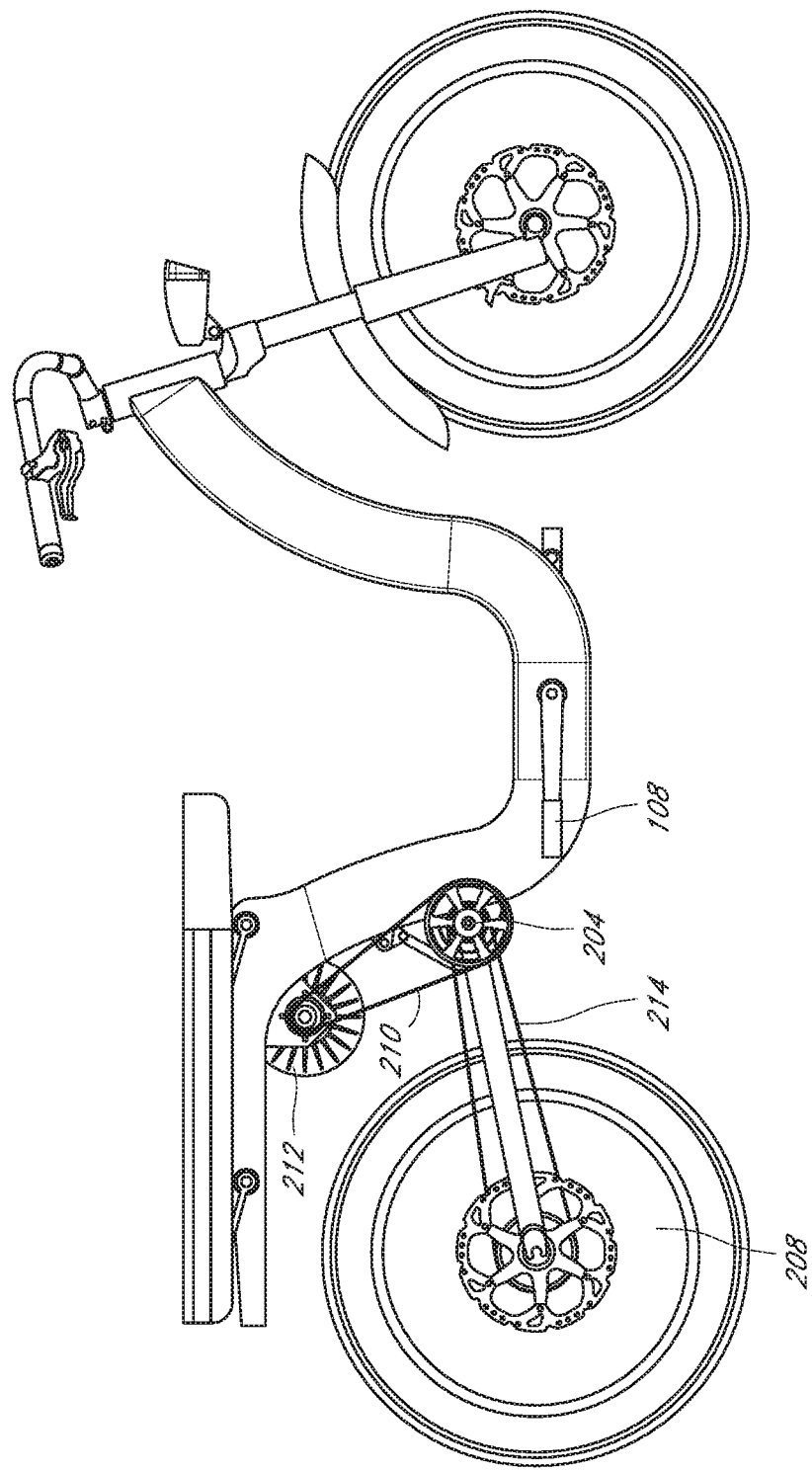
FIGS. 1-2 depict drivetrain layout features of an example of one embodiment of an electric bicycle.

Embodiments will now be described with reference to the accompanying figures. The terminology used in the description presented herein is not intended to be interpreted in any limited or restrictive manner, simply because it is being utilized in conjunction with a detailed description of certain specific embodiments. Furthermore, embodiments may comprise several novel features, no single one of which is solely responsible for its desirable attributes or which is essential to practicing the embodiments herein described.

The disclosure herein provides systems, methods, and devices that enable various forms of automatic transmission systems and automatic transmission control methods for electrically powered bicycles. Bicycles, manual or electric, often comprise some form of gear shifting mechanism that enables a gear ratio between a pedal crank and a drive wheel to be varied. For example, in a road bicycle, a pedal crank is coupled to one or more drive sprockets, and a drive wheel is coupled to one or more driven sprockets. A drive chain connects the drive sprockets to the driven sprockets, and a derailleur for each set of sprocket sets is configured to move the chain among the various sprockets to enable a change in gear ratio.

Another method of enabling gear ratio change in a bicycle is using an internally geared hub for the drive wheel. In such an embodiment, the drive chain is coupled to a single driven sprocket, and that single driven sprocket is coupled to a hub which comprises a plurality of selectable gear ranges. An internally geared hub can present a cleaner appearance, because externally a rider would only see the single driven sprocket, instead of a plurality of adjacent sprockets. However, an internally geared hub system is typically more expensive, sometimes an order of magnitude more expensive, than a derailleur based system. Also, an internally geared hub system may have many small and/or moving components, requiring more maintenance and resulting in a higher efficiency loss. Further, a derailleur-based system can often handle more torque than an internally geared hub, and is thus often more reliable. Also, internally geared hubs shift most efficiently under certain conditions, such as when no load is applied. As the load increases, it becomes more difficult for an internally geared hub to shift gears and/or the internally geared hub may fail once the load passes a load threshold.

One advantage of an internally geared hub over a typical derailleur-based system, however, is that an internally geared hub is typically able to shift gears when the bicycle is stationary. A derailleur, however, requires that the drive chain and sprocket set be rotating to effect a gear change. Further, a derailleur-based gear change may be difficult and/or may fail if the drive chain and sprocket are not rotating or moving at an optimum speed or within a range of optimum speeds, and/or if the drive chain is not under at least a minimum threshold amount of load (e.g., an amount of tension between the drive sprocket and driven sprocket).

A common event for a rider of a bicycle is a fast stop. In a fast stop event, the rider wishes to stop the bicycle quickly, such as due to a car or other object appearing in front of the rider's path. In such an event, the rider will stop pedaling and concurrently apply the brakes of the bicycle to quickly come to a stop. One problem with such an event is that, typically after stopping it is desirable for the bicycle to be in a lower gear than the bicycle was in before stopping. With an internally geared hub, this is less of an issue, because internally geared hubs can be capable of shifting gears without moving. With a derailleur-based system, however, the rider is left in a predicament wherein the bicycle has come to a stop, and the bicycle is in a higher gear than is desirable for restarting the motion of the bicycle. It is then difficult for the rider to downshift the bicycle, because the rider will need to attempt to start pedaling the bicycle in the high undesirable gear while simultaneously attempting to shift to the lower gear—an awkward sequence of events which may not always be successful and/or which may be inefficient and/or require quite a bit of effort and coordination on the rider's part. Otherwise, the derailleur based system in this situation may cause the chain drive to jump and/or shift multiple gears at once, jamming the gears and/or failing to effect the gear change.

In some embodiments, it is desirable to keep the drive chain that drives the driven sprocket set stationery, motionless, nonrotating, and/or the like when torque or power is not being introduced to the drive wheel by the pedals and/or motor. In other words, it can be desirable to move the chain when transmitting power or torque to the drive wheel from the petals and/or motor, but to cease the motion of the chain or to substantially decrease any motion of the chain when not applying power or torque to the drive wheel. An exception to this would be a limited motion of the chain and thus the driven sprocket set to effect a gear change as disclosed herein. One benefit of keeping the chain stationary when not introducing power to the wheel and/or when not effecting a gear change is that the system can potentially operate more efficiently than if the chain were still moving. Another benefit is safety related. For example, when a user is pedaling a bicycle and/or operating a throttle to instruct the motor to apply power or torque to the drive while, the user expects that the chain is rotating, because it needs to rotate to introduce power or torque into the drive wheel. However, when a user does not desire torque or power to be added to the rear wheel, such as during coasting, freewheeling, braking, and/or the like, the user may not expect the chain to be moving and thus may not be as cautious when trying to stay away from the chain to avoid being harmed by the moving chain. Further, in a maneuver such as a fast stop or emergency stop, a user will likely be focusing most or all of his or her attention on stopping the bicycle and thus could unintentionally touch his or her leg, clothes, and/or the like against the chain. If the chain is moving, this could cause damage or harm. Accordingly, in some embodiments, it can be desirable to limit the amount of motion of the drive chain to only periods when it is necessary to move the chain, such as when power is being applied to the rear wheel and/or when a gear change is being conducted.

Various embodiments disclosed herein address these problems and others by providing derailleur-based bicycle transmission systems, methods, and devices that enable an electric bicycle to use a durable and relatively inexpensive derailleur system while still being able to downshift during a fast stop event (and in some embodiments during other events and/or at any time the rider wishes to shift and/or the bicycle controller determines a shift is desirable). In some embodiments, a derailleur-based automatic transmission system comprises a motor and a pedal crank that are each individually capable of rotating a driven sprocket set coupled to the drive wheel. In some embodiments, the system is configured to, when a fast stop event is occurring, operate the motor to rotate the driven sprocket set at a speed sufficient to effect a downshift, while also keeping the driven sprocket set at a speed less than or equal to the current speed of the drive wheel, so that no additional drive torque is introduced to the drive wheel, which would counteract the ability of the bicycle to stop.

The disclosure herein also provides improved systems for a versatile electric bicycle that is flexible and easily adaptable to accommodate various needs and requirements. In general, most electric bicycles available today are restricted and/or designed to be used with particular parts, such as motors and/or batteries. Further, most electric bicycles are confined to a particular seating configuration and/or are not easily transferable across different jurisdictions due to varying regulations and laws that control the electric bicycle industry. However, the embodiments of a versatile electric bicycle disclosed herein provide standard features and/or models that are configured to be easily adapted to accommodate parts of varying dimensions, different seating configurations, and/or particular laws and regulations of different jurisdictions. Further, due to its flexibility, embodiments of an electric bicycle disclosed herein are durable and timeless as the motor, battery, and/or other parts of the electric bicycle can be easily upgraded and replaced.

The term "electric bicycle" used in the present disclosure may refer to any of electric bicycles, electric assist bicycles, mopeds and other "limited use vehicles" as defined by law (for example, a two- or three-wheeled cycle that can go faster than 30 mph and reach a top speed of 40 mph). However, the term is not limited to such examples, and may include other similar devices currently existing or to be developed in the future.

Frame Design

In an embodiment, an electric bicycle comprises an ergonomically designed frame. In some embodiments, the electric bicycle comprises a step-through frame.

Wave Seat Configuration

In general, electric bicycles can either be powered manually by pedaling or electrically by an electric motor. When an electric bicycle is powered by the electric motor, the rider may prefer to sit lower and further back for a more comfortable position while cruising. Also, it may be preferable for the rider to be able to lay his or her feet flat on the ground when the electric bicycle is stopped. Alternatively, a rider may choose to manually pedal the electric bicycle in some situations, such as when the batteries are out of power or when the motor is not providing enough power and/or speed. When pedaling, a rider may prefer to sit or stand substantially above the pedals for a more dynamic riding configuration. As such, due to differences in physical action of the two options, different riding and/or seating positions can be preferred depending on how the electric bicycle is being powered.

In certain embodiments, the seat is configured to be switched between one or more seating configurations via an ottoman bracket and/or an L-shaped bracket. In some embodiments, the ottoman bracket and/or L-shaped bracket can comprise one or more holes that allow for one or more seat configurations. In certain embodiments, the seat is configured to be manually adjusted and locked into a particular position. In other embodiments, the seat is configured to be automatically moved and locked into a preferable position via a button or other input that a rider can select.

In some embodiments, the vertical distance of the seat from the bottom of the wheels can be adjusted from about 25 inches to about 45 inches or any other range. For example, depending on the seat configuration, the vertical distance of the seat from the bottom of the wheels can be about 25 inches, 26 inches, 27 inches, 28 inches, 29 inches, 30 inches, 31 inches, 32 inches, 33 inches, 34 inches, 35 inches, 36 inches, 37 inches, 38 inches, 39 inches, 40 inches, 41 inches, 42 inches, 43 inches, 44 inches, 45 inches, or any other height.

In certain embodiments, the horizontal distance from the front of the seat to the handles of the electric bicycle can be adjusted from about 10 inches to about 25 inches or any other range. For example, depending on the seat configuration, the horizontal distance from the front of the seat to the handles of the electric bicycle can be about 10 inches, 11 inches, 12 inches, 13 inches, 14 inches, 15 inches, 16 inches, 17 inches, 18 inches, 19 inches, 20 inches, 21 inches, 22 inches, 23 inches, 24 inches, 25 inches, or any other distance.

Motor Placement

Generally, most electric bicycles comprise a hub-motor that is located within the rear wheel frame of the electric bicycle. However, such designs have many disadvantages. For example, because hub-motors cannot be configured to be used with gears, a specially designed low RPM motor must be used for placement inside the rear wheel frame. Also, the weight of the hub-motor naturally affects the weight of the rear wheel and affects the dynamics of the electric bicycle. In addition, due to the restrictions in size and placement, only motors of a particular size and/or configuration may be installed in such electric bicycles. Further, it can be difficult to remove and/or install a hub-motor due to its placement inside the rear wheel frame. In some cases, the whole rear wheel has to be replaced in order to replace a hub-motor.

Figure 2:
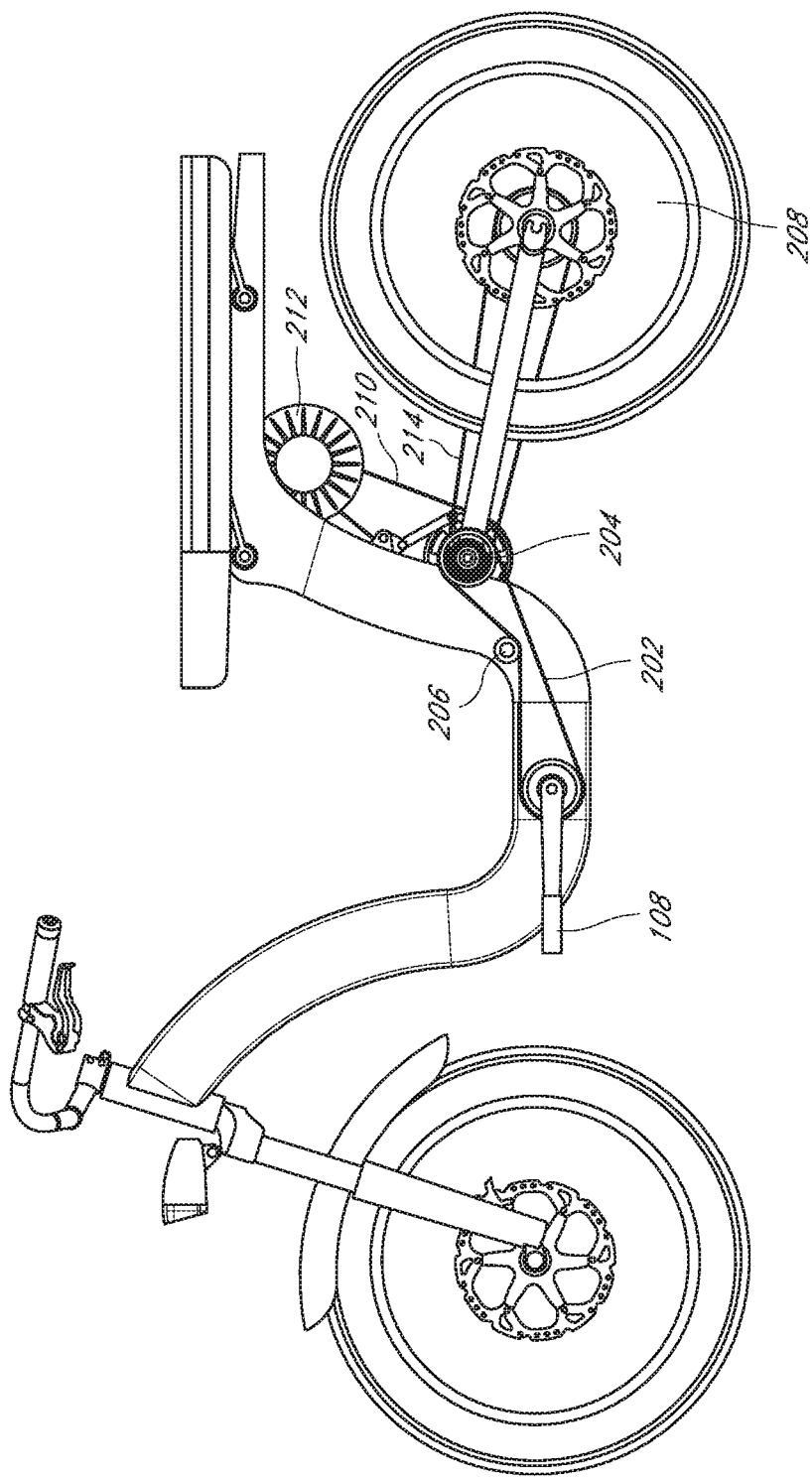

In contrast, in an embodiment of an electric bicycle, the electric motor is placed outside the rear wheel frame. In some embodiments, the electric motor is placed substantially beneath the seat frame. FIGS. 1-2 illustrate an example of an embodiment of an electric bicycle where the electric motor 212 is located beneath the seat and is attached directly to the bicycle frame itself. In some embodiments, the motor 212 is located substantially above a jackshaft 204. In other embodiments, the motor may be positioned elsewhere, such as in a mid-drive arrangement, described in more detail below.

By locating the motor 212 outside of the rear wheel frame, such embodiments of an electric bicycle are more flexible and adaptable as they can be used with a wider range of motors. For example, because the motor 212 is not located within the rear wheel frame, the motor 212 can be configured to be used in conjunction with hinge gears, which allows use of a number of conventional motors that are not necessarily specially designed for low RPM. Also, there are less weight restrictions as the weight of the wheel itself is not affected by the motor 212. In addition, motors 212 with a wider range of sizes and/or configurations can be installed. Further, it is easier to remove and/or install a motor 212.

Drivetrain Design

In some embodiments, the drivetrain of an electric bicycle is chain-free and comprises belt drives 202, 210, 214, as shown in FIG. 2 (although in other embodiments, one or more of these belts may be replaced with a chain or other power transmission component). In some embodiments, one or more belt drives 202, 210, 214 of the electric bicycle or portions thereof are covered. For example, in some embodiments where one or more bags 300 are located in the rear of the bicycle, one or more belt drives 202, 210, 214, jackshaft 214, motor 212, and/or portions thereof may be protectively covered by portions of one or more bags 300.

In certain embodiments, an electric bicycle is configured such that there is complete independence between the electric motor 212 and pedals 108. For example, in some embodiments, there is no or substantially no resistance to the pedals 108 from the motor 212 when the motor is powering the electric bicycle. In certain embodiments, when the electric bicycle is powered by the motor 212, the motor 212 moves a first belt drive 210, which further turns a jackshaft 204. As the jackshaft 204 is turned, a second belt drive 214 is moved thereby turning the real wheel 208.

In some embodiments, when the pedals 108 are moved to power the electric bicycle, the pedals 108 move a third belt drive 202 which further turns a jackshaft 204. In some embodiments, an electric bicycle comprises an idler 206 contacting the third belt drive 202. In some embodiments, the same jackshaft 204 is turned by both manual pedaling 108 and the electric motor 212. As the jackshaft 204 is turned, the second belt drive 214 is moved thereby turning the rear wheel 208.

In some embodiments, the independence of the pedals 108 and motor 212 is created at least in part by one or more clutches. For example, an embodiment of an electric bicycle may comprise a clutch that selectively disengages the pedals or pedal crank 108 from the jack shaft 204 and/or a driven sprocket set, and/or a clutch that selectively disengages the motor 212 from the jack shaft 204 and/or a driven sprocket set. In some embodiments, one or more of these clutches are active clutches, meaning they can be activated and or deactivated electronically by a controller. In some embodiments, one or more of these clutches are automatic, such as a one-way freewheel clutch. For example, one-way freewheel clutches may be used that enable the pedal crank 108 and/or motor 212 to automatically be decoupled from the jack shaft 204 and/or driven sprocket set when the drive wheel is rotating at a faster rate than would be generated by the current speed of the pedal crank 108 and/or motor 212 in view of the current gear ratio. In various embodiments, the clutches may be located at various locations. For example, a clutch that decouples the pedal crank 108 from the jack shaft 204 may be located at the pedal crank or the jack shaft. It may be desirable in some embodiments to locate the clutch at the jack shaft, so that the chain or belt 202 does not continue rotating or moving when the pedals are not being used. As another example, a clutch that decouples the motor 212 from the jack shaft 204 may be located at the motor 212 or the jack shaft 204. Similarly to the clutch for the pedals, it may be desirable in some embodiments to locate the clutch at the jack shaft, so that the chain or belt 210 does not continue rotating or moving when the motor is not being used. Further, a clutch that decouples the jack shaft 204 from a driven sprocket set may be located at the jack shaft or the driven sprocket set. Further, a clutch that decouples the driven sprocket set from the drive wheel may be located at the junction between the driven sprocket set and the drive wheel.

In some embodiments, the first, second, and third belt drives 210, 214, 202 substantially form a T-shape with the jackshaft 204 located at the intersection. In certain embodiments, the angle between the first and second belt drives 210, 214, the first and third belt drives 210, 202, and/or the second and third belt drives 214, 202 is about 5°, about 10°, about 15°, about 20°, about 25°, about 30°, about 35°, about 40°, about 45°, about 50°, about 55°, about 60°, about 65°, about 70°, about 75°, about 80°, about 85°, about 90°, about 95°, about 100°, about 105°, about 110°, about 115°, about 120°, about 125°, about 130°, about 135°, about 140°, about 145°, about 150°, about 155°, about 160°, about 165°, about 170°, about 175°, about 180°, or any other angle.

In some embodiments, the third belt drive 202 is located on one side of the electric bicycle and the first and second belt drives 210, 214 are located on the other side of the electric bicycle. In other embodiments, the second belt drive 214 is located on one side of the electric bicycle and the first and third belt drives 210, 202 are located on the other side of the electric bicycle. In certain embodiments, the first belt drive 210 is located on one side of the electric bicycle and the second and third belt drives 214, 202 are located on the other side of the electric bicycle. In other embodiments, the first, second, and third belt drives 210, 214, 202 are all located on the same side of the electric bicycle.

In some embodiments, the various belt drives are on pulleys attached to the various axles. For instance, a first belt drive 210 may be on a pulley connected to the electric motor 212 and on a pulley connected to the jackshaft 204. An axle is connected to this pulley on the jackshaft 204 which connects to other pulleys on the axle. Among these other pulleys, one pulley may be connected to the second belt drive 214 and another pulley connected to the third belt drive 202. The jackshaft 204 and axle may have more or less pulleys in various arrangements and locations, depending on the arrangements and locations of the various belt drives.

Automatic Transmission

The embodiment illustrated in FIGS. 1-2 illustrates an embodiment comprising a single gear. For example, in this embodiment, belts 202, 210, and 214 are each positioned to engage constant-size pulleys that enables a constant gear ratio or mechanical advantage. However, in various other embodiments, the electric bicycle may comprise a multi-gear system, to add to the versatility of the electric bicycle. For example, the electric bicycle may comprise an internally geared hub system. Bicycles with internally geared hub systems are capable of shifting gears without rotating the bicycle's chain. The internally geared hub can be implemented with planetary or epicyclic gears. In these configurations, the gears and lubricants are sealed within the shell of the hub gear.

Some embodiments, as will be described in more detail below, comprise a partially or fully automatic transmission for a bicycle equipped with a derailleur and an electric motor not mounted inside the wheel (hub motor). For example, an electric bicycle as disclosed herein may comprise an electronically-operatable chain driven derailleur system. Unlike the internally geared hub, the electronically-operatable chain driven derailleur system is exposed. An electronically-operatable derailleur may comprise, for example, an actuator that moves an arm or other feature of the derailleur in response to a command from an electronic controller to effect a movement of the chain from one sprocket to another. The actuator may be mechanical, electromechanical, hydraulic, pneumatic, and/or the like. One example of an electronically-operatable chain driven multi-gear derailleur system which may be used in some of the automatic transmission system embodiments disclosed herein may be seen in U.S. Pat. No. 8,768,585, entitled SHIFT CONTROL SYSTEM FOR POWER-ASSISTED BICYCLE, which is incorporated by reference herein in its entirety. There are many advantages of a derailleur system over an internally geared hub system. First, derailleur systems are typically significantly cheaper than internally geared hubs. Additionally, derailleur systems are typically capable of channeling and/or transmitting much more power to the drive wheel. This can be even more important in the field of electric bicycles, since a motor may be able to input more power and/or torque to the system than a user would be able to input through a pedal crank. Internally geared hub systems are less suitable for high-stress or high power inputs and maintain lower overall gear ratios. Further, derailleur systems may comprise a larger range of gear ratios than internally geared hubs. Internally geared hub gear ratios are limited by the size of the housing. Derailleur systems also comprise sprocket sets that allow for a wider range of gears and the ability to change gear ratios separately from the wheel assembly. Internally geared hubs may also in some cases be less efficient than derailleur systems.

In some embodiments, the electric bicycle comprises an electronically controllable actuator (for example electronically controllable actuator 903 illustrated in FIGS. 9A-9B and 10A-10B) configured to move the derailleur to enable changing of gears automatically, without requiring a rider to manually control the derailleur. For example, in a typical non-electric bicycle, a control lever located at the handlebars is mechanically coupled through a cable to a derailleur. Movement of that control lever by the rider causes translation of the cable, which causes movement of the derailleur to change gears. However, in various embodiments disclosed herein, an electronically controllable actuator can replace (or in some embodiments, supplement) that manual handlebar control lever. In some embodiments, the electronically controllable derailleur actuator is positioned at or on, or integrated into, the derailleur itself. In some embodiments, the actuator is positioned away from or separate from the derailleur, and mechanically linked to the derailleur using, for example, a cable, a hydraulic or pneumatic tube, and/or the like. In some embodiments, the actuator and/or the derailleur comprises a pneumatic or hydraulic cylinder configured to move the derailleur to change gears. In some embodiments, the actuator and/or derailleur comprises an electromechanical mechanism, such as, for example, a ball screw, a lead screw, a motor, a solenoid, and/or the like configured to enable electronically controllable movement of the derailleur.

In some embodiments, an automatic transmission system for an electric bicycle comprises a mechanism or mechanisms for decoupling a pedal input from a motor output, driven sprocket or pulley, derailleur sprocket, and/or driven wheel. As used herein, the term derailleur sprocket is used to refer broadly to a set of two or more concentric sprockets with which the derailleur interacts by moving the chain among the set of sprockets. The term derailleur sprocket may also be used to refer to similar systems that do not necessarily use sprockets, such as a belt driven system, wherein the derailleur (or similar mechanism) moves a belt among two or more concentric pulley surfaces. In some embodiments, the system comprises one or more clutches, such as, for example, a one-way clutch, a magnetic clutch, an electronically operatable clutch, and/or the like. The clutch or clutches may be positioned at one or more locations, such as at a pedal crank, a jackshaft, a driven wheel, a derailleur sprocket, and/or the like.

An embodiment of an automatic transmission system can have an active clutch. For example, an embodiment of an automatic transmission system that allows decoupling of a user input device, such as a pedal crank, from a motor and/or derailleur sprocket, can enable the automatic transmission system to rotate the motor and/or the derailleur sprocket at an optimum gear-change speed (or within a range of desirable speeds), even if that speed is unrelated or unassociated with the present pedal crank speed. When the pedal crank is motionless or not turning, the system may be configured to still be able to rotate the motor and/or derailleur sprocket to cause or enable a gear change. As another example, the pedal crank may be rotating, but the present speed of the pedal crank and the present gear ratio may not result in an optimum rotational speed of the derailleur sprocket for effecting a gear change. Accordingly, if an optimum shift would be enabled by a derailleur sprocket speed, the system may be configured to decouple or at least partially decouple the pedal crank from the derailleur sprocket to enable the motor (and/or the momentum of the bicycle) to turn the derailleur sprocket at a faster speed than it would be turned by the pedal crank in the current gear alone. As another example, if the pedal crank is causing the derailleur sprocket to turn at a faster speed than would be ideal for a shift, the system may be configured to decouple or at least partially decouple the pedal crank from the derailleur sprocket to enable the derailleur sprocket to turn at a slower speed, at least temporarily, to affect a more optimum gear shifting condition. In some embodiments, the motor (and/or a separate braking actuator) may be configured to provide a braking force to the derailleur sprocket to slow the speed of the derailleur sprocket.

Some embodiments of an automatic transmission system can comprise one or more one-way freewheel clutches. In one example embodiment, a motor drives a jackshaft via chain or belt, and a different chain or belt between the jackshaft and rear wheel then drives the rear wheel (for example, as shown in FIGS. 9A & 9B, described below). Further, a pedal system in some embodiments is engaged via the one-way freewheel (clutch) either at the jackshaft input or at pedal hub. The one-way clutch allows the motor to drive the chain without creating movement at the pedals, so the control system can decouple the shifting action from the pedals. The one-way clutch allows the automatic transmission to smoothly change gears, even under load. In some embodiments, the clutch is automatic, without requiring active engagement or disengagement by the user device or onboard computing unit. In other embodiments, the clutch is configured to be selectively engaged and/or disengaged as needed by the user device and/or onboard computing unit. In some embodiments, the system may comprise one or more additional one-way clutches, which may be positioned at one or more locations, such as at a pedal crank, a jackshaft, a driven wheel, a derailleur sprocket, a motor shaft, and/or the like.

In some embodiments, the automatic derailleur transmission concepts disclosed herein can be configured to work with any electric bike configuration where the motor is not mounted in the wheel (e.g., where there is at least one belt, chain, and/or the like that is used to transfer torque from the motor to the driven or powered wheel). For example an electric bicycle may comprise a mid-drive motor positioned at a bottom bracket and a one-way freewheel, magnetic or other electrically controlled mechanical clutch is used to disconnect the pedals from the front sprocket when a user stops pedaling. In this embodiment, the electric motor drives the front sprocket to create required chain movement during the shift event (as opposed to driving a jackshaft). One example of such a mid-drive configuration is shown in FIGS. 10A & 10B, described below.

Mid-drive motors are generally compatible with derailleur systems, such as the systems described herein. In some embodiments, mid-drive motors may be compatible with internally geared hubs, belt drives, and/or the like. Mid-drive motors may be enabled to use a plurality of sensors to measure pedal power, wheel speed, pedal cadence, among other bicycle parameters, conditions, and/or statistics. Mid-drive motors may also be integrated with electronic derailleur systems, such as the systems disclosed herein. These configurations may assist the user and provide for a smoother gear change.

Electric bicycles comprising a mid-drive motor may have many advantages. Unlike hub motors, which may bypass the transmission system to directly drive a wheel, in mid-drive motor systems, the electric bicycle may be able to transmit motor power through the transmission system, resulting in longer battery life for the motor and better handling of the bicycle in use. As described above, mid-drive motors may also be centrally located or positioned at a bottom bracket. Since the mid-drive motor is positioned at a bottom bracket, the weight of the motor is distributed more evenly Mid-drive motors can also provide motor power through integration with the pedal crank. In these systems, the mid-drive motor drives the pedal crank instead of the wheel itself, enabling the mid-drive motor to increase performance and have a higher torque output than similarly powered hub motors. Accordingly, the mid-drive motor may be able to provide a higher torque density (i.e. higher torque output per unit of weight of the motor) when, for example, torque is applied by both the motor and the pedal crank because both would contribute to the transmission system.

Bag(s) Configuration

Figure 3:
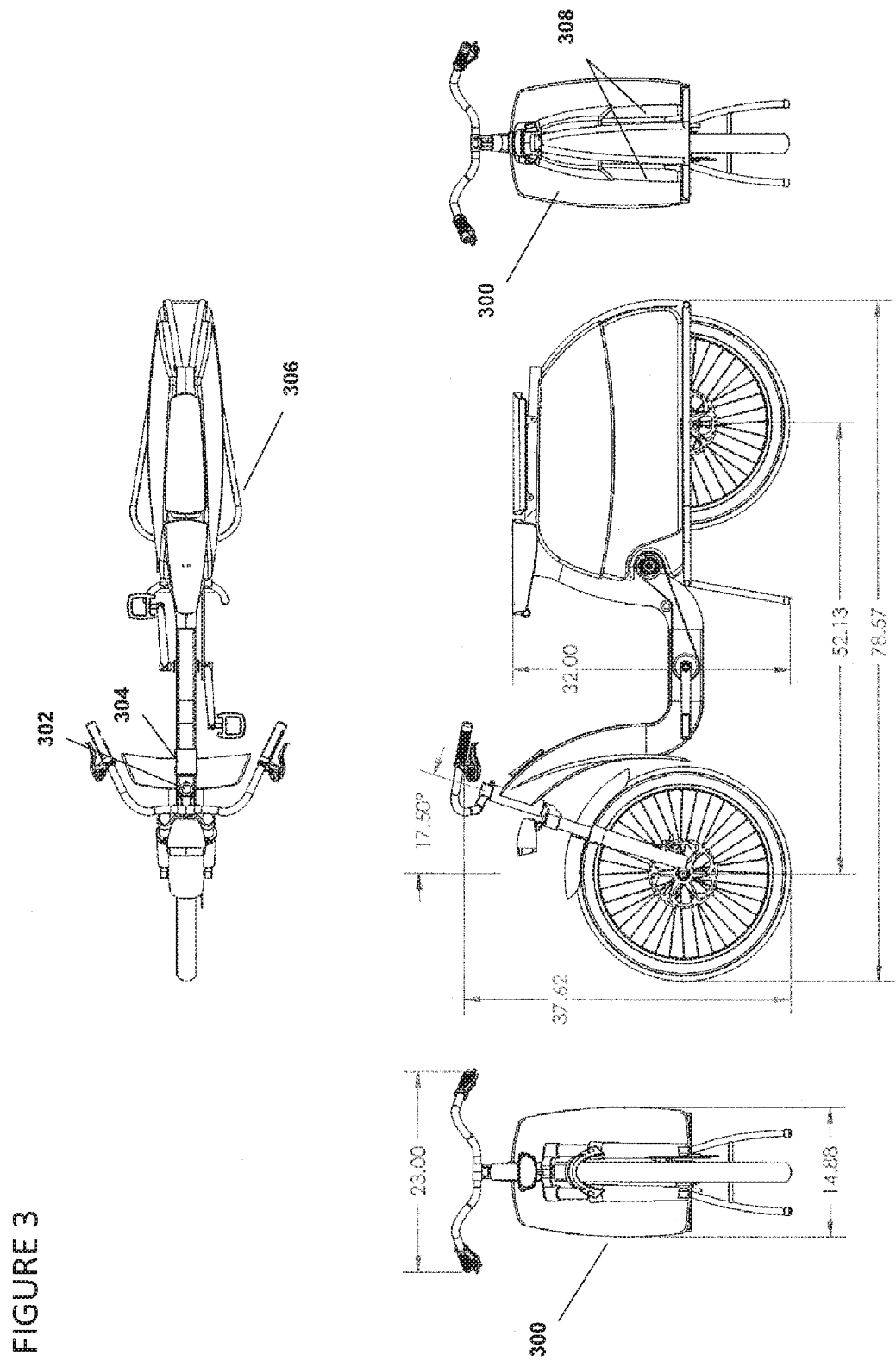
FIG. 3 depicts an example of one embodiment of an electric bicycle with one or more bags covering the rear wheel.

In an embodiment, an electric bicycle comprises one or more bags configured to hold cargo or any other item(s). FIG. 3 illustrates an example of an embodiment of an electric bicycle comprising one or more bags.

In an embodiment, one or more bags 300 are located in the rear of the electric bicycle. In some embodiments, the one or more bags 300 are permanently or semi-permanently integrated to the electric bicycle. In other embodiments, the one or more bags 300 or parts thereof are selectively removable from the electric bicycle.

In some embodiments, the one or more bags 300 cover the rear wheel or portions thereof, providing a protective cover for the rear wheel. By covering the rear wheel or portions thereof, the one or more bags 300 can reduce exposure of the rider and/or rear wheel to dirt or other debris. The one or more bags 300 can also function as a protective layer for the rear wheel against shock or damage.

In some embodiments, the one or more bags 300 comprise a hard shell and/or soft compartment or pouch. The hard shell or structure can be made of any type of hard material, such as a hard plastic for example. The hard shell can provide a rigid structure to the one or more bags 300 such that the one or more bags 300 can maintain a certain form and/or shape. Also, the hard shell can prevent the one or more bags 300 from poking into the rear wheel frame.

In some embodiments, the one or more bags 300 comprise a semi-rigid outer shell connected to a main body of the bag with an elastic material. The elastic material can be configured to hold the outer shell tight or close to the body when the bag is not full, and to hold the shell tight to cargo placed within the bag when the bag is full or partially full. In some embodiments, the bags 300 are configured to be waterproof and/or cut resistant. In some embodiments, the bags 300 are permanently fixed to the bicycle frame or removably attached to the bicycle frame. In some embodiments, as further described below, the bags 300 may comprise one or more internal or external pockets for holding various items, such as, for example, batteries, a controller, and/or dirty locks. In some embodiments, one or more pockets are specially configured to hold a particular item, such as a battery, controller, dirty locks, and/or the like. For example, a special pocket for holding a dirty lock may comprise waterproof or other materials and/or a seal to reduce a risk of transferring dirt, contaminants, and/or moisture from the lock to other items within the bag.

The soft compartment or pouch can be made of any soft material, such as any type of fabric, soft plastic, canvas, leather, or any other appropriate material or trim. The soft compartment or pouch can be flexible in some embodiments to be able to carry a wide variety of items in size and dimension. In certain embodiments, when empty, the soft compartment or pouch collapses to lay flat against the hard shell and closer to the rear wheel. This can allow for a more aerodynamic configuration of the electric bicycle. In contrast, in certain embodiments, when one or more items are placed in the soft compartment or pouch, the soft compartment or pouch can expand while being supported by the hard shell.

In certain embodiments, an electric bicycle comprises a platform 306. The platform 306 can be configured to be used for resting a rider's feet and/or for providing support for the soft compartment or pouch.

Dedicated Pockets

In some embodiments, the one or more bags 300 comprise one or more compartments or pouches that are dedicated for particular items. For example, in certain embodiments, the one or more bags 300 can comprise one or more dedicated battery pouches or compartments 308 for battery mounting and suspension on one or both sides of the electric bicycle. In other embodiments, the one or more bags 300 can comprise one or more dedicated compartments or pouches for a bicycle lock and/or helmet. For example, the one or more bags 300 may be used to hold or store dirty locks.

In certain embodiments, the one or more bags 300 comprise a plurality of dedicated battery compartments 308 in various locations. In some embodiments, the compartments 308 are on one or both sides of the bags 300. In other embodiments, the compartments may be, instead or in addition to being on the sides, on the back end of the bags 300 that is farthest from the handles on the bike. Still in other embodiments, the compartments 308 may be on a front side of the bags 300 that is farthest toward the handles of the bike. Or the compartments 308 may be in any combination of front, side, and/or back locations on the bags 300. The compartments 308 may further by located in any of these positions on both or either the exterior of the bags 300 and/or the interior of the bags 300. In some embodiments, the bags 300 may also include covers to protect the bags 300 from the elements and/or hide the bags 300 from view for security purposes.

In certain embodiments, the one or more bags 300 comprise a plurality of dedicated battery compartments 308 of various shapes and sizes to accommodate batteries of various shapes and sizes. In some embodiments, the battery compartments 308 are substantially rectangular in shape and are configured to hold a plurality of batteries shaped approximately like a brick and of various sizes. For instance, the compartments 308 may be configured to hold batteries approximately shaped like a brick and/or rectangle with width, depth, and length dimensions, respectively, of about 3.375 inches by about 2.625 inches by about 10.250 inches. Other possible width dimensions include about 0.5 inches, about 1 inch, about 1.5 inches, about 2 inches, about 2.5 inches, about 3 inches, about 3.5 inches, about 4 inches, about 4.5 inches, about 5 inches, about 5.5 inches, or about 6 inches, or any other width. Other possible depth dimensions include about 0.5 inches, about 1 inch, about 1.5 inches, about 2 inches, about 2.5 inches, about 3 inches, about 3.5 inches, or about 4 inches, about 4.5 inches, about 5 inches, about 5.5 inches, or about 6 inches, or any other depth. Other possible length dimensions include about 0.5 inches, about 1 inch, about 1.5 inches, about 2 inches, about 2.5 inches, about 3 inches, about 3.5 inches, about 4 inches, about 4.5 inches, about 5 inches, about 5.5 inches, about 6 inches, about 6.5 inches, about 7 inches, about 7.5 inches, about 8 inches, about 8.5 inches, about 9 inches, about 9.5 inches, about 10 inches, about 10.5 inches, about 11 inches, about 11.5 inches, about 12 inches, about 12.5 inches, about 13 inches, about 13.5 inches, about 14 inches, about 14.5 inches, about 15 inches, about 15.5 inches, about 16 inches, about 16.5 inches, about 17 inches, about 17.5 inches, or about 18 inches, or any other depth.

The compartments 308 may be sized to accommodate a single size and shape of battery or the compartments 308 may be sized to accommodate many ranges of battery sizes and shapes. In other embodiments, the battery compartments 308 are substantially square, circular, and/or oval in shape, and/or any other shape, whether typical or atypical.

Square-shaped compartments may have length and width dimensions of about 0.5 inches, about 1 inch, about 1.5 inches, about 2 inches, about 2.5 inches, about 3 inches, about 3.5 inches, about 4 inches, about 4.5 inches, about 5 inches, about 5.5 inches, about 6 inches, about 6.5 inches, about 7 inches, about 7.5 inches, about 8 inches, about 8.5 inches, about 9 inches, about 9.5 inches, about 10 inches, about 10.5 inches, about 11 inches, about 11.5 inches, about 12 inches, about 12.5 inches, about 13 inches, about 13.5 inches, about 14 inches, about 14.5 inches, about 15 inches, about 15.5 inches, about 16 inches, about 16.5 inches, about 17 inches, about 17.5 inches, or about 18 inches, or any other length and width. Square-shaped compartments 308 may have height dimensions of about 0.5 inches, about 1 inch, about 1.5 inches, about 2 inches, about 2.5 inches, about 3 inches, about 3.5 inches, about 4 inches, about 4.5 inches, about 5 inches, about 5.5 inches, about 6 inches, or any other height.

Circular-shaped or oval-shaped compartments 308 may have a minimum diameter and/or a height of about 0.5 inches, about 1 inch, about 1.5 inches, about 2 inches, about 2.5 inches, about 3 inches, about 3.5 inches, about 4 inches, about 4.5 inches, about 5 inches, about 5.5 inches, about 6 inches, about 6.5 inches, about 7 inches, about 7.5 inches, about 8 inches, about 8.5 inches, about 9 inches, about 9.5 inches, about 10 inches, about 10.5 inches, about 11 inches, about 11.5 inches, about 12 inches, about 12.5 inches, about 13 inches, about 13.5 inches, about 14 inches, about 14.5 inches, about 15 inches, about 15.5 inches, about 16 inches, about 16.5 inches, about 17 inches, about 17.5 inches, or about 18 inches, or any other diameter and/or height.

In certain embodiments, the dedicated battery compartments 308 are diagonal or substantially vertical in configuration with an opening at the top to allow for easy installation and removal while providing sufficient stability such that the battery does not fall out.

In some embodiments, an electric bicycle comprises a plurality of battery compartments 308 on one or multiple sides of the electric bicycle. For example, in some embodiments, one, two, or three battery compartments 308 may be located on each side of the electric bicycle. In other embodiments, more battery compartments 308 may be located on one side compared to another side. In certain embodiments, one or more battery compartments 308 may be located on only one side of the electric bicycle.

In some embodiments, a dedicated battery compartment(s) 202 further comprises a connector mechanism to connect the battery to the electric bicycle such that battery can power the electric motor. For example, a dedicated battery compartment(s) 202 can comprise a cradle, dock, cable(s), and/or pin(s) for connecting the battery to the electric bicycle. A battery compartment(s) 202 can also comprise any other battery connecting mechanism that is currently well-known or is to be developed in the future. In some embodiments, the battery connecting mechanism that connects the one or more batteries to the motor is protectively covered by the one or more bags 300.

In certain embodiments, unlike some other electric bicycles that are restricted to a proprietary battery, a number of different types of batteries can be installed. Dedicated battery compartments 308 of some embodiments are flexible in shape and/or size and can accommodate batteries with varying shapes and/or sizes. In addition, in certain embodiments, a dedicated battery compartment 202 can allow for simple installation and/or removal of batteries for recharging, replacing, and/or upgrading among other purposes.

The bags 300 and/or compartments 308 in some embodiments are aerodynamically shaped to minimize and/or lower drag on the bike when moving and thus increase efficiency of the electrical system. In other embodiments, the bags 300 and/or compartments 308 are bulkier and sacrifice aerodynamic efficiency for more storage space.

Vehicle Control System

Currently, different states and/or countries have different laws governing the use of electric bicycles. For example, the definition and/or restrictions of electric bicycles and their power can be different in each state and/or country. Laws regarding the maximum speed of electric bicycles can also be different. For example, the U.S. federal law defines and restricts electric bicycles to bicycles with electric motors of less than 750 Watts and with a top motor-powered speed of less than 20 miles per hour with a rider that weighs less than 170 pounds. In comparison, California restricts the maximum power output of electric bicycles to 1000 Watts, and Florida allows electric bicycles with a maximum power output of up to 5000 Watts.

Needless to say, the different laws and regulations of each jurisdiction create a challenge for electric bicycle manufacturers in creating a single product that complies with all such rules. One option for manufacturers is to develop a low-powered electric bicycle that complies with the regulations of all jurisdictions and can be sold everywhere. However, such electric bicycles are unnecessarily restricted in both power and/or speed and consequently may not appeal to consumers thereby hindering sales. Another option is to develop customized electric bicycle products for each jurisdiction to maximize the power and/or speed allowed by the laws of each jurisdiction. However, this option inherently leads to high costs in design and manufacturing of multiple models.

As an alternative to developing a sufficiently low-powered electric bicycle to comply with all state regulations or developing customized electric bicycles per jurisdiction, an embodiment of an electric bicycle as disclosed herein uses software and a computer system(s) to control the maximum power output and/or speed within the regulations of each jurisdiction. In other words, in some embodiments, an electric bicycle with hardware specifications above the regulations of one or more jurisdictions is adaptable to such regulations via software and a computer system(s). Such electric bicycles can maximize the power and/or speed limits allowable by the laws of each jurisdiction. In this way, a manufacturer of an electric bicycle only needs to design, build, and market one electric bicycle product for a plurality of jurisdictions as long as the software and computer system(s) can limit the maximum power and/or speed output of the electric motor within each jurisdiction's regulations.

Figure 4:
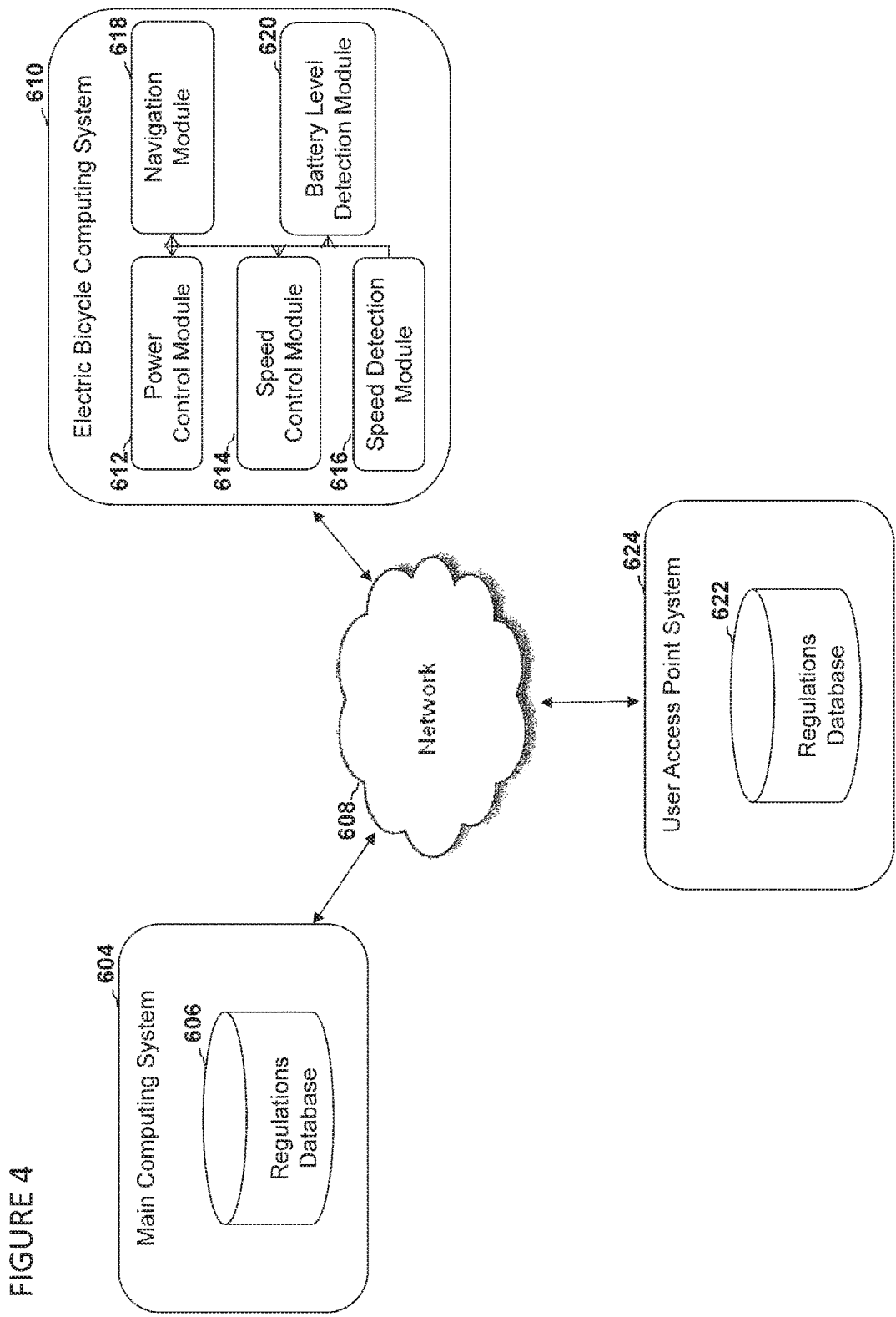
FIG. 4 is a block diagram depicting a high level overview of one embodiment of a system for controlling the maximum output of a motor of an electric bicycle.

FIG. 4 is a block diagram illustrating a high level overview of one embodiment of a system for controlling the output of an electric bicycle's motor within a jurisdiction's regulations. In an embodiment, a main computing system 604, an electric bicycle computing system 610, and/or a user access point system 624 can be in communication over a network 608 to control the output of an electric bicycle's motor. For example, in some embodiments, a main computing system 604, an electric bicycle computing system 610, and/or a user access point system 624 are configured to control the performance characteristics of an electric bicycle such that the performance characteristics comply with a particular jurisdiction or government's regulations and requirements. In certain embodiments, appropriate software configured to be used in conjunction with the system to control and/or monitor an electric bicycle's performance can be purchased and/or downloaded for installation. For example, in some embodiments, software for a user access point system 624 can be downloaded and installed from a mobile app store.

In some embodiments, the system comprises a user access point system 624 configured to receive input from a rider and/or other user to specify one or more control parameters for controlling the electric bicycle. Such control parameters may include "pedal assist" or "power on demand" modes of power application (for example, pedal-assist mode in which the motor assists the rider based on the pressure of his or her pedaling, and power-on-demand mode in which the rider has control of the amount of power output by the motor), total power output (for example, in watts), top speed, maximum torque and/or brake on or off status. Additionally or alternatively, the system (for example, electric bicycle computing system 610) may be configured to determine one or more of such control parameters based on information provided by the user (for example, via the user access point system 624) and/or information retrieved from one or more internal or external databases (for example, regulations databases 606 or 622). For example, in certain embodiments, the rider and/or other user can input a maximum speed and/or power value for the motor. In other embodiments, the rider and/or other user can input and/or select the state or other jurisdiction where the electric bicycle is located, and the system can be configured to automatically configure the one or more control parameters such that the electric bicycle complies with the regulations of the particular state or jurisdiction. In some embodiments, the system can be configured to automatically detect the appropriate state or other jurisdiction, without requiring a user to manually input and/or select a state or other jurisdiction. For example, as further described below, the system can be configured to utilize a GPS module to detect the bike's location.

In some embodiments, the user access point system 624 determines the maximum speed and/or power output allowable under the appropriate regulations of the selected jurisdiction based on a regulations database 622 of the user access point system 624. In other embodiments, the user access point system 624 communicates with a main computing system 604 comprising a regulations database 606 to determine the maximum speed and/or power output allowable under the appropriate regulations of the selected jurisdiction. Regulations related to electric bicycles, maximum allowable power and/or speed of electric bicycles, and/or other related information can be stored in the regulations database 606, 622. The user access point system 624 and/or main computing system 604 can be configured to periodically update the one or more regulations databases 606, 622 by communicating with one or more other computing systems and/or databases.

In certain embodiments, a GPS module is configured to detect the current location of the electric bicycle and electronically transmit the location to the user access point system 624, electric bicycle computing system 610, and/or main computing system 604. Based on the detected location, the user access point system 624, electric bicycle computing system 610, and/or main computing system 604 can automatically access the regulations database and determine the maximum speed and/or power output allowed under the appropriate regulations of the jurisdiction where the electric bicycle is currently located. In some embodiments, the GPS module is configured to periodically check the location of the electric bicycle and electronically transmit the location to the user access point system 624, electric bicycle computing system 610, and/or main computing system 604. Based on the periodically updated location of the electric bicycle, the user access point system 624, electric bicycle computing system 610, and/or main computing system 604 can update the maximum speed and/or power output allowed under the regulations of a new jurisdiction when necessary due to the electric bicycle's movement. In some embodiments, the GPS module is part of a user's smartphone or other portable computing device. In some embodiments, in addition to, or in lieu of a GPS module, other locating or geolocation methods may be utilized, such as, for example, cellular phone tower triangulation, detection of Wi-Fi access points or other radio devices or broadcasts, and/or the like.

In some embodiments, an electric bicycle comprises an electric bicycle computing system 610. In certain embodiments, an electric bicycle computing system 610 is configured to limit the maximum power and/or speed of the electric bicycle according to the determined maximum allowable power and/or speed from one or more regulations databases 606, 622. In certain embodiments, the electric bicycle computing system 610 comprises a power control module 612 configured to control and/or limit the maximum power output of the electric bicycle's motor. The electric bicycle computing system 610 can also comprise a speed control module 614 configured to control and/or limit the maximum speed output of the motor.

In some embodiments, some or all data and user settings are logged, time/date stamped, and preserved for a period of time (for example, to preserve manufacturer liability in the event of a crash or misuse). For example, every time a location-based performance profile is created (for example, either from user specification of the location information or specific control parameters, or from automatic determination of location information and automatic configuration of relevant control parameters), any data generated and settings specified by the user are logged in a log database. In some embodiments, other data is also logged, such as speed, acceleration, distance traveled, throttle position, brake control position, distance from nearby vehicles, and/or the like. The system may be configured to periodically back up to another server or system for storage or analysis the data stored in the log database.

In certain embodiments, the user access point system 624 can be configured to enable the user (for example, rider) of the electric bicycle to select a riding mode from a plurality of riding modes such as a "bicycle" mode, a "moped" mode or an "off road only" mode. In one embodiment, the bicycle mode may, for example, turn off or disconnect the motor of the electric bicycle and enable driving the electric bicycle solely from pedaling, the moped mode may, for example, limit the capacity of the electric bicycle (for example, top speed, motor output, etc.) such that the electric bicycle falls under the definition of a moped (for example, the power control module 612 may be configured to limit the power output and/or speed of the electric bicycle to be within the limits defined by law), and the off-road-only mode may, for example, allow uninhibited top speed and/or motor output.

In certain embodiments, the electric bicycle computing system 610 and/or user access point system 624 comprises a speed detection module 616 configured to detect the current speed of the electric bicycle. The detected speed of the electric bicycle can be displayed to the rider via the user access point system 624 and/or other display means.

In certain embodiments, the electric bicycle computing system 610 and/or user access point system 624 comprises a navigation module 618 configured to communicate with a GPS module, detect the current location of the electric bicycle, and/or give directions to the rider. Directions can be displayed to the rider via the user access point system 624 and/or other display means.

In certain embodiments, the electric bicycle computing system 610 and/or user access point system 624 comprises a battery level detection module 620 configured to detect and/or monitor the current battery level by communicating with one or more battery sensors. In some embodiments, the electric bicycle computing system 610 is further configured to estimate a remaining distance or range the electric bicycle can travel based on the detected battery level. In some embodiments, the current battery level and/or estimated range is displayed to the rider via the user access point system 624 and/or other display means.

In certain embodiments, the electric bicycle computing system 610 and/or user access point system 624 are configured to control the suspension settings of the electric bicycle. In some embodiments, the user access point system 624 can display a suspension setting input field to a rider. The rider can insert a suspension setting of the rider's choice using the user access point system 624. In certain embodiments, the user access point system 624 is configured to receive a suspension setting selection from a rider and transmit the selection to the electric bicycle computing system 610. The electric bicycle computing system 610 can receive the selection input and control the electric bicycle accordingly.

For example, in some embodiments, an electric bicycle can be configured to have one or more suspension settings, such as soft, medium, or hard. If a rider selects the soft suspension setting, the electric bicycle computing system 610 can loosen the suspension settings of the electric bicycle by adjusting a shock absorbing mechanism of the electric bicycle. If a rider selects the hard suspension setting, the electric bicycle computing system 610 can tighten the suspension settings of the electric bicycle by adjusting a spring and/or shock absorbing mechanism of the electric bicycle.

The network may comprise one or more internet connections, secure peer-to-peer connections, secure socket layer (SSL) connections over the internet, virtual private network (VPN) connections over the internet, or other secure connections over the internet, private network connections, dedicated network connections (for example, IDSN, T1, or the like), wireless or cellular connections, or the like or any combination of the foregoing.

Computing System

Figure 5:
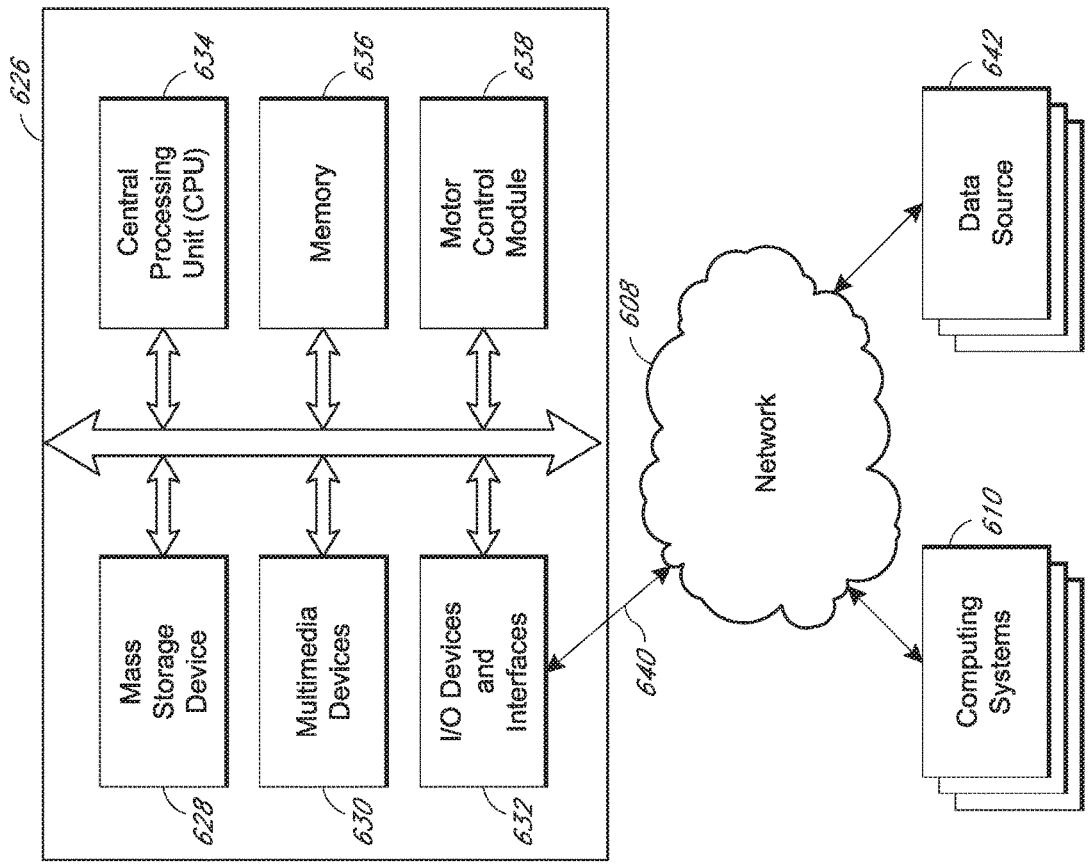
FIG. 5 is a block diagram depicting one embodiment of a computer hardware system configured to run software for implementing one or more embodiments of the motor output control system described herein.

In some embodiments, the computer clients and/or servers described above take the form of a computing system 626 illustrated in FIG. 5, which is a block diagram of one embodiment of a computing system that is in communication with one or more computing systems 610 and/or one or more data sources 642 via one or more networks 608. The computing system 626 may be used to implement one or more of the systems and methods described herein, including the systems and methods related to controlling a bicycle's motor and the systems and methods related to controlling a transmission. In addition, in one embodiment, the computing system 626 may be configured to control the output speed and/or power of an electric bicycle's motor. While FIG. 5 illustrates one embodiment of a computing system 626, it is recognized that the functionality provided for in the components and modules of computing system 626 may be combined into fewer components and modules or further separated into additional components and modules.

Motor Control Module

In one embodiment, the system 626 comprises a motor control module 638 that carries out the functions described herein with reference to controlling the output power and/or speed of an electric bicycle's motor. The motor control module 638 may be executed on the computing system 626 by a central processing unit 634 discussed further below.

In some embodiments, the motor control module 638 alternatively or additionally is configured to carry out the functions disclosed herein in relation to an automatic transmission system for an electric bicycle. For example, the motor control module 638 may be an electric bicycle controller 670. The electric bicycle controller 670 may be configured to receive inputs from one or more sensors to receive information related to, for example, bicycle speed, wheel speed, pedal crank speed, jack shaft speed, angle of inclination, rate of acceleration, bicycle operating mode, pedal input torque, pedal cadence, and/or the like. Based on the information received from the one or more sensors, the electric bicycle controller may automatically determine whether a stop event is occurring, calculate an optimal gear change speed, calculate an optimal gear change window, operate the motor, and/or communicate with an electronic derailleur to effect a gear change.

Figure 6:
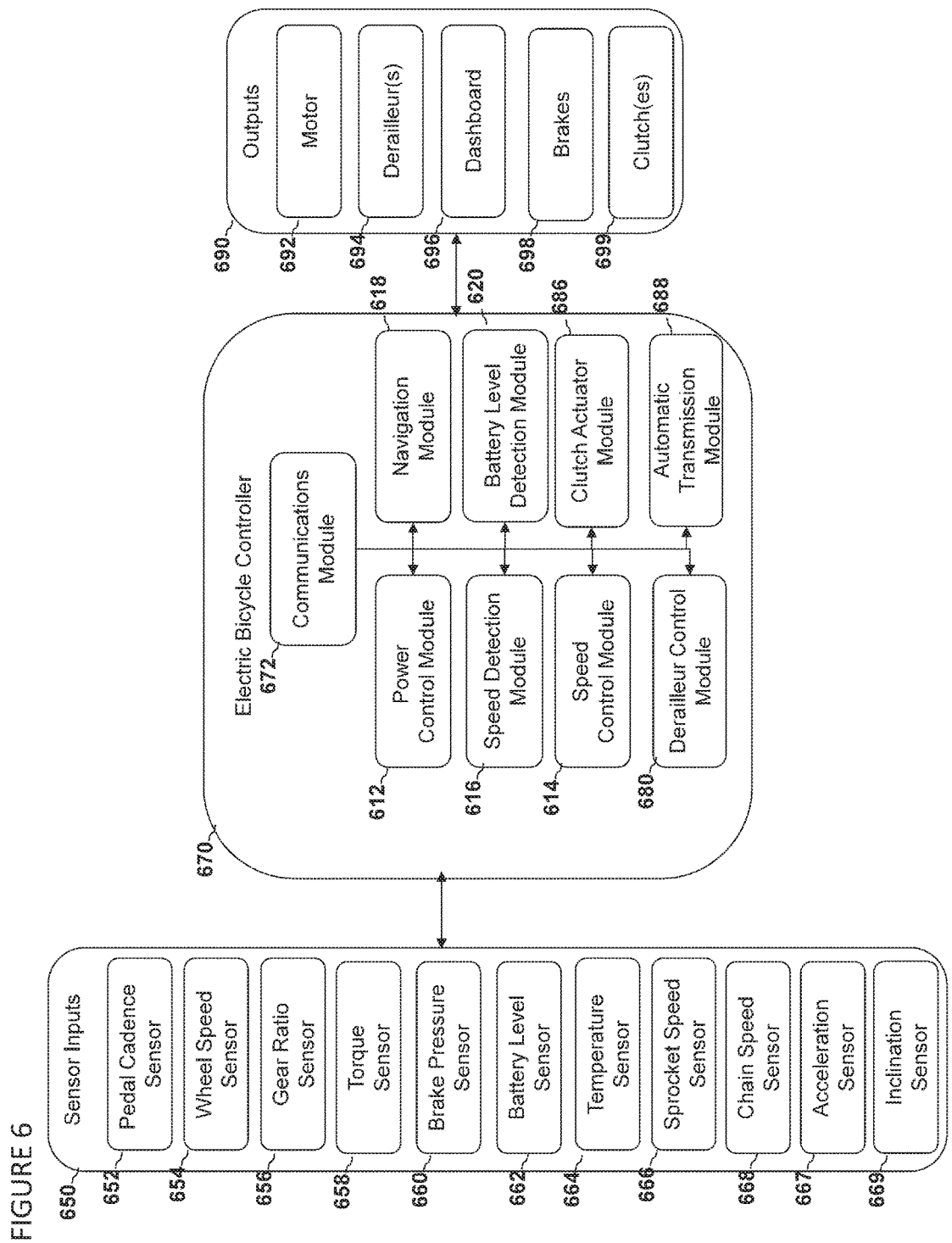
FIG. 6 is a block diagram depicting an overview of one embodiment of a system configured to run software for controlling one or more embodiments of the automatic transmission system described herein.

FIG. 6 illustrates an embodiment of the electric bicycle controller 670, which is configured to receive sensor inputs 650 from one or more sensors to receive information, such as a plurality of bicycle parameters, conditions, and/or statistics. One or more of the sensors may, in some embodiments, be part of the controller 670 or external to the controller 670. The sensor inputs 650 may continuously measure or detect one or more of the plurality of bicycle parameters, conditions, and/or statistics. In embodiments, the sensor inputs 650 may measure or detect one or more the plurality of bicycle parameters, conditions, and/or statistics at predetermined intervals. Additionally, the sensor inputs 650 may measure or detect one or more of the plurality of bicycle parameters, conditions, and/or statistics automatically.

Although the embodiment illustrated in FIG. 6 comprises a plurality of sensors, various embodiments may comprise more or less sensors, different types of sensors, and/or may only utilize a subset of the available sensors at any particular time. Further, one or more of the sensors may be direct or indirect sensors. For example, a sensor may directly measure or detect its assigned parameter, or the sensor may indirectly measure or detect its assigned parameter by, for example, calculating its assigned parameter based on its direct measurement or detection of a different parameter and/or the direct or indirect measurement or detection of one or more different sensors. For example, a sensor configured to output a driven sprocket rotational speed may directly measure that speed (for example, by using a Hall Effect sensor disposed adjacent the driven sprocket). In some embodiments, however, the sensor may, for example, indirectly measure the driven sprocket speed by detecting the speed of a related component, such as a jack shaft, and calculating the driven sprocket speed based on a current gear ratio. Some of the plurality of sensors may, in some embodiments, comprise hardware sensors or be implemented in software. For example, if hardware sensors are used to detect the jack shaft speed and current gear ratio, the driven sprocket speed sensor may in some embodiments be implemented completely in a software module that takes into account the readings from the jack shaft speed and gear ratio sensors.

In an embodiment, the one or more sensors may include a pedal cadence sensor 652 configured to measure, for example, the number of revolutions of the pedal crank during a period of time, such as a second, minute, hour, and/or the like. Specifically, pedal cadence sensor 652 may measure the rate at which a cyclist or user is pedaling and/or turning the pedals. In some embodiments, the one or more sensors may comprise a wheel speed sensor 654 configured to measure the speed of the front and/or rear wheels. A gear ratio sensor 656 may be configured to measure the gear ratio at any time. In some embodiments, the gear ratio sensor is based at least in part on detecting a current position (and/or a current instructed position) of a derailleur arm. Torque sensor 658 may be configured to measure the total torque being applied to the electric vehicle system, the torque applied by the motor, and/or the torque applied by the pedals. In some embodiments, the torque sensor 658 is configured to output a value having a relationship, linear or otherwise, with a detected amount of torque applied by the motor and/or pedals to the drive wheel. In some embodiments, the toque sensor 658 (or a different sensor or sensors) is configured to merely indicate whether the motor and/or pedals are currently applying any torque to the drive wheel.

In some embodiments, a brake pressure sensor 660 may take measurements of the pressure applied to a brake or plurality of brakes. The brake pressure sensor 660 may measure the brake pressure applied by the user and/or automatically applied by the electric bicycle controller 670. As described below, in some embodiments, the electric bicycle controller 670 may use a brake pressure measured by the brake pressure sensor 660 to determine (or to help determine) whether a stop event is occurring and/or about to occur. In addition, electric bicycle controller 670 can detect, based on the brake pressure measured by the brake pressure sensor 660, wheel speed measured by wheel speed sensor 654, and/or other sensor, a wheel lockup condition (for example, the brakes are applied so quickly that the wheels lock up). In an embodiment, the wheel speed sensor 654 detects, measures and/or determines that the wheel speed is zero. The electric bicycle controller 670 may determine that in this embodiment, a wheel lockup condition is occurring. In embodiments, under such conditions, that include a one-way clutch system, the system would need to prevent the shift from occurring and/or stop the shift in gears to determine a wheel lockup condition is occurring Battery level sensor 662 may be configured to measure a battery level. Temperature sensor 664 may be configured to measure a temperature of the electric bicycle system as well as each component of the electric bicycle system. Sprocket speed sensor 666 may be configured to measure a speed of a sprocket set or one or more sprockets of the sprocket set. Sprocket speed sensor 666 (and/or one or more additional speed sensors) may be configured to measure a derailleur sprocket set (e.g., the driven sprocket set), rear sprocket set, front sprocket set, and/or any other sprocket set. Chain speed sensor 668 may be configured to measure a speed of a chain of the electric bicycle system. The chain speed sensor 668 may also be configured to measure a speed of a belt drive, pulleys, and/or any other drive of the electric bicycle system.

In some embodiments, an acceleration sensor 667 (for example, an accelerometer) may measure, calculate, and/or otherwise determine a level or rate of acceleration and/or deceleration of the electric bicycle, wheels, sprocket sets, chain drives, pedals, pedal crank, braking forces, and/or the like. In some embodiments, acceleration sensor 669 is configured to merely indicate whether the electric bicycle is accelerating and/or decelerating. Inclination sensor 669 (which, in some embodiments, may be the same as acceleration sensor 667) may measure, calculate, and/or otherwise determine an angle of inclination or climb angle of the electric bicycle, seat, wheels, chain drive, sprocket sets, motor and/or the like. In some embodiments, inclination sensor 669 is configured to merely indicate whether the electric bicycle is at an incline and/or decline. The sensor inputs 650 may comprise any number or combination of sensors in various embodiments.

In some embodiments, the system may comprise a mobile device that also includes any number or combination of the sensors, including the sensors discussed above with reference to FIG. 6 and/or other sensors. For example, the mobile device may comprise an accelerometer and/or other sensors to measure the plurality of bicycle parameters, conditions, and/or statistics. In an embodiment, the sensors of the mobile device may measure, detect, and/or calculate bicycle speed, wheel speed, pedal crank speed, jack shaft speed, angle of inclination, rate of acceleration, bicycle operating mode, pedal input torque, pedal cadence, and/or the like. In an embodiment, the mobile device can communicate with the electric bicycle controller 670 and/or control module 638 to transmit, wirelessly and/or through a wired connection, the plurality of measured, detected and/or calculated bicycle parameters, conditions, and/or statistics.

As described below, the electric bicycle controller 670 and/or control module 638 may be configured to utilize this information to determine an optimal gear for the bicycle to presently be in and to cause an electronically controllable derailleur and/or other mechanism to cause the bicycle to shift into that gear. Similar to the motor control module 638 described above, electric bicycle controller 670 may comprise several modules for operating an electric bicycle. For example, the electric bicycle controller 670 may comprise a communications module 672 configured to communicate with one or more computing systems, one or more sensors, one or more modules, and/or one or more outputs, and/or the like. The electric bicycle controller 670 may also comprise a navigation module 618, battery level detection module 620, clutch actuator module 686, automatic transmission module 688, power control module 612, speed detection module 616, speed control module 614, derailleur control module 680, and/or a plurality of other modules.

In an embodiment, the electric bicycle controller 670 comprises navigation module 618 configured to communicate with a GPS module, detect the current location of the electric bicycle, and/or give directions to the rider. Battery level detection module 620 may be configured to detect and/or monitor the current battery level by communicating with one or more battery sensors. In some embodiments, the electric bicycle controller 672 is configured to estimate a remaining distance or range the electric bicycle can travel based on the detected battery level. In some embodiments, the current battery level and/or estimated range is displayed to the rider via the user access point system 624 and/or other display means. In some embodiments, the system may be configured to take into account a current location of the bicycle and/or an anticipated path of the bicycle, determined by the navigation module, to anticipate a need for a gear change, and then automatically effect that gear change. For example, the system may determine that the bicycle is nearing a steep hill and thus dynamically effect a downshift. Further, in some embodiments, the system may be configured to take into account the detected battery level, potentially in combination with an anticipated route determined by the navigation module, to dynamically utilize optimum gear ranges and/or to dynamically switch to pedal-only or pedal-assist mode as needed, such as in less steep terrain, to ensure the battery will have sufficient power to complete the anticipated route. Clutch actuator module 686 may be configured to decouple the pedals or pedal crank from the rest of the drivetrain, such as to allow the motor to briefly rotate the chain at a different rate than a rate of rotation of the pedals, to more easily facilitate a gear change. Automatic transmission module 688 may be configured to control the automatic transmission. The automatic transmission may comprise any arrangement, such as the arrangements disclosed herein.

In certain embodiments, the electric bicycle controller 670 comprises a power control module 612 configured to control and/or limit the maximum power output of the electric bicycle's motor. The electric bicycle computing controller 670 can also comprise a speed control module 614 configured to control and/or limit the maximum speed output of the motor. The electric bicycle controller may also comprise a derailleur control module configured to control an electronically operatable derailleur system.

In some embodiments, the electric bicycle controller 670 and/or control module 638 may further control one or more other output devices, such as a motor 692, one or more derailleurs 694, dashboard 696, brakes 698, one or more clutches 699 and/or the like. Motor 692 may be used to provide torque to the system. Motor 692 may be used to provide a braking force to the system. Motor 692 may be configured to be rotating at various speeds and at various times. In some embodiments, motor 692 receives commands from the electronic bicycle controller 670. In some embodiments, the user manually inputs commands (i.e. turns the motor on/off and/or changes the motor speed) to the motor 692. Motor 692 can be used in combination with and/or independently from the pedals and/or pedal crank. Motor 692 can also, in some embodiments, be used only in fast stop situations described herein or at any point during use of the electric bicycle system. In some embodiments, it may be desirable to utilize a relatively small and inexpensive motor that is not necessarily intended to be a primary drive motor, but that is primarily intended to be used to effect shifts when the drive chain is not otherwise loaded by the pedal crank (for example, in a fast stop situation). In some embodiments, more than one actively controllable derailleur 694 may be used. For example, the bicycle system may comprise a front sprocket set and a rear sprocket set, each having an associated derailleur. The concepts disclosed herein are not limited to any particular number of sprocket sets, however, and thus could be applied to a system having one, two, three, four, five, or more derailleurs. Derailleur(s) 694 may comprise an actuator configured to enable the derailleur to move chain and/or belt drives from one sprocket to a second sprocket to effect a gear change. Derailleur(s) 694 can be mechanically, electrically, and/or electro-mechanically controlled. In some embodiments, derailleur(s) 694 can receive commands from the electric bicycle controller 670. In some embodiments, derailleur(s) can operate manually or automatically. In some embodiments, the user manually inputs commands to the derailleur(s) 694 by using a lever and/or other input.

Dashboard 696 may be configured to display any of the measured, detected and/or calculated bicycle parameters, conditions, and/or statistics described herein, as well as directions, controls, inputs, and/or the like. Dashboard 696 may be automatically updated based on updated measured, detected and/or calculated bicycle parameters, conditions, and/or statistics described herein, as well as directions, controls, inputs, and/or the like. In some embodiments, brakes 698 may be applied manually by the user (i.e. a hand brake and/or user input to the electric bicycle controller). In some embodiments, brakes 698 may be applied automatically depending on the measured, detected and/or calculated bicycle parameters, conditions, and/or statistics. Clutch(es) 699 may comprise one, two, three, four, five, or more clutches. Clutch(es) 699 may be an active clutch as described herein. In some embodiments, clutch(es) 699 may be a free-wheel clutch as further described herein.

In general, the word "module," as used herein, refers to logic embodied in hardware or firmware, or to a collection of software instructions, possibly having entry and exit points, written in a programming language, such as, for example, COBOL, CICS, Java, Lua, C or C++, although various modules disclosed herein may comprise at least some hardware components. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Computing System Components

In one embodiment, the computing system 626 also comprises a mainframe computer suitable for controlling and/or communicating with large databases, performing high volume transaction processing, and generating reports from large databases. The computing system 626 also comprises a central processing unit ("CPU") 634, which may comprise a conventional microprocessor. The computing system 626 further comprises a memory 636, such as random access memory ("RAM") for temporary storage of information and/or a read only memory ("ROM") for permanent storage of information, and a mass storage device 628, such as a hard drive, diskette, or optical media storage device. Typically, the modules of the computing system 626 are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

The computing system 626 comprises one or more commonly available input/output (I/O) devices and interfaces 632, such as a keyboard, mouse, touchpad, and printer. In one embodiment, the I/O devices and interfaces 632 comprise one or more display devices, such as a monitor, that allows the visual presentation of data to a user. More particularly, a display device provides for the presentation of GUIs, application software data, and multimedia presentations, for example. In the embodiment of FIG. 5, the I/O devices and interfaces 632 also provide a communications interface to various external devices. The computing system 626 may also comprise one or more multimedia devices 630, such as speakers, video cards, graphics accelerators, and microphones, for example.

Computing System Device/Operating System

The computing system 626 may run on a variety of computing devices, such as, for example, a server, a Windows server, a Structure Query Language server, a Unix server, a personal computer, a mainframe computer, a laptop computer, a cell phone, a personal digital assistant, a kiosk, an audio player, and so forth. The computing system 200 is generally controlled and coordinated by operating system software, such as z/OS, Windows 95, Windows 98, Windows NT, Windows 2000, Windows XP, Windows Vista, Windows 7, Linux, BSD, SunOS, Solaris, or other compatible operating systems. In Macintosh systems, the operating system may be any available operating system, such as MAC OS X. In other embodiments, the computing system 200 may be controlled by a proprietary operating system. Conventional operating systems control and schedule computer processes for execution, perform memory management, provide file system, networking, and I/O services, and provide a user interface, such as a graphical user interface ("GUI"), among other things.

Network

In the embodiment of FIG. 5, the computing system 626 is coupled to a network 608, such as a LAN, WAN, or the Internet, for example, via a wired, wireless, or combination of wired and wireless, communication link 640. The network 608 communicates with various computing devices and/or other electronic devices via wired or wireless communication links. In the embodiment of FIG. 5, the network 608 is communicating with one or more computing systems 610 and/or one or more data sources 642.

Access to the motor control module 638 of the computer system 626 by computing systems 610 and/or by data sources 642 may be through a web-enabled user access point such as the computing systems' 610 or data source's 642 personal computer, cellular phone, laptop, or other device capable of connecting to the network 608. Such a device may have a browser module is implemented as a module that uses text, graphics, audio, video, and other media to present data and to allow interaction with data via the network 608.

The browser module may be implemented as a combination of an all points addressable display such as a cathode-ray tube (CRT), a liquid crystal display (LCD), a plasma display, or other types and/or combinations of displays. In addition, the browser module may be implemented to communicate with input devices 632 and may also comprise software with the appropriate interfaces which allow a user to access data through the use of stylized screen elements such as, for example, menus, windows, dialog boxes, toolbars, and controls (for example, radio buttons, check boxes, sliding scales, and so forth). Furthermore, the browser module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition a touch screen may act as a hybrid input/output device. In another embodiment, a user may interact with the system more directly such as through a system terminal connected to the computing system without communications over the Internet, a WAN, or LAN, or similar network.

In some embodiments, the system 626 may comprise a physical or logical connection established between a remote microprocessor and a mainframe host computer for the express purpose of uploading, downloading, or viewing interactive data and databases on-line in real time. The remote microprocessor may be operated by an entity operating the computer system 626, including the client server systems or the main server system, and/or may be operated by one or more of the data sources 642 and/or one or more of the computing systems. In some embodiments, terminal emulation software may be used on the microprocessor for participating in the micro-mainframe link.

In some embodiments, computing systems 610 who are internal to an entity operating the computer system 626 may access the motor control module 638 internally as an application or process run by the CPU 634.

Other Systems

In addition to the systems that are illustrated in FIGS. 4-6, the network 608 may communicate with other data sources or other computing devices. The computing system 626 may also comprise one or more internal and/or external data sources. In some embodiments, one or more of the data repositories and the data sources may be implemented using a relational database, such as DB2, Sybase, Oracle, CodeBase and Microsoft® SQL Server as well as other types of databases such as, for example, a flat file database, an entity-relationship database, and object-oriented database, and/or a record-based database.

User Access Point

In an embodiment, a user access point or user access point system 624 comprises a personal computer, a laptop computer, a cellular phone, an iPhone®, a GPS system, a Blackberry® device, a portable computing device, a server, a computer workstation, a local area network of individual computers, an interactive kiosk, a personal digital assistant, an interactive wireless communications device, a handheld computer, an embedded computing device, or the like.

The embodiments described above in FIGS. 1-3 illustrate examples of an embodiment of an electric bicycle that is configured to be coupled with a user access point or user access point system 624 for controlling the electric bicycle. In some embodiments, the user access point system 624 can be permanently and/or semi-permanently installed. In other embodiments, the user access point system 624 is a mobile device that can be selectively installed and/or removed. In some embodiments, the user access point system 624 comprises more than one separate computing device, such as, for example, a cellular phone or smartphone configured to be carried by a user and to electronically communicate, wired and/or wirelessly, with a separate computing device configured to be permanently or removably attached to the electric bicycle. In some embodiments, a user access point system 624 is configured to communicate with the electric bicycle computing system 610 wirelessly. For example, the user access point system 624 may comprise a smartphone configured to be carried by a user and to wirelessly communicate with the electric bicycle computing system 610.

In some embodiments, a user access point system 624 is configured to be attached and installed to the electric bicycle via a connector mechanism 302. In some embodiments, the connector mechanism 302 comprises a cradle or a case that is configured to hold the user access point system and a data port configured to connect the user access point system 624 to the electric bicycle computing system 610. The cradle or case 302 can be permanently or semi-permanently attached to the frame of the electric bicycle.

In some embodiments, the user access point system 624 can comprise software that allows the rider to select or set a maximum output of the electric motor's power and/or speed. For example, using the software and/or user interface, the rider can set the maximum output of the electric bicycle's power to about or exactly 250 watts (currently the most common requirement in Europe), about or exactly 500 watts, about or exactly 600 watts, about or exactly 700 watts, about or exactly 750 watts, about or exactly 800 watts, about or exactly 900 watts, about or exactly 1000 watts, about or exactly 1100 watts, about or exactly 1200 watts, about or exactly 1300 watts, about or exactly 1400 watts, about or exactly 1500 watts, about or exactly 2000 watts, about or exactly 3000 watts, about or exactly 4000 watts, about or exactly 5000 watts or any other value.

In certain embodiments, the software and/or user interface of the user access point system 624 is configured such that a user only needs to select a state or jurisdiction where the user is currently located. The user access point system 624 in certain embodiments comprises a pre-stored database that comprises data of each jurisdiction's electric bicycle regulations and/or laws. For example, a user access point system 624 can have pre-stored the maximum power and/or speed of electric bicycles allowed by law of one or more jurisdictions. In other embodiments, data related to the maximum power and/or speed of electric bicycles allowed by law of one or more jurisdictions is stored in the electric bicycle computing system 610 and/or main computing system 604.

In some embodiments, when a rider selects a particular jurisdiction, the user access point system 624, electric bicycle computing system 610, and/or main computing system 604 is configured to determine the maximum power and/or speed limit of the selected jurisdiction using a pre-stored database and restrict the electric bicycle accordingly. For example, if a rider inputted via the user access point system 624 that the rider is currently in California, the user access point system 624, electric bicycle computing system 610, and/or main computing system 604 can be configured to automatically determine or identify that the maximum power output for electric bicycles in California is 1000 watts and limit the power output of the electric motor to 1000 watts.

In certain embodiments, the user access point system 624 and/or electric bicycle computing system 610 comprises a GPS module which is configured to automatically and/or periodically determine the location of the electric bicycle, identify the maximum power and/or speed allowed by the appropriate jurisdiction's regulations, and limit the power and/or speed of the electric bicycle to that value(s). For example, if the user access point system 624 and/or electric bicycle computing system 610 determines that the electric bicycle is currently in California, the user access point system 624 and/or electric bicycle computing system 610 can automatically identify that the maximum power output in California is limited to 1000 watts and restrict the power output to 1000 watts. When the user access point system 300 and/or electric bicycle computing system 610 determines that the electric bicycle is in New York at a later point in time, the user access point system 624 and/or electric bicycle computing system can then automatically determine that the electric bicycle is currently in New York and restrict the maximum power and/or speed of the electric bicycle to the maximum value(s) allowed in New York.

In certain embodiments, the user access point system 624 can be configured to provide additional features as well. For example, the user access point system 624 can be configured to function as a speedometer and display the current speed of the electric bicycle to the user. In some embodiments, the user access point system 624 can also provide a GPS navigation system and/or map to the user via a GPS module. Furthermore, in certain embodiments, the user access point system 624 can be configured to provide driving education software to the user for efficient driving.

In addition, in some embodiments the user access point system 624 is configured to function as a key for locking and/or unlocking the electric bicycle. For example, when a rider attaches and/or installs the user access point system 624 into the electric bicycle, the electric bicycle computing system 610 can be configured to validate the identity of the user access point system 624 and unlock the electric bicycle if validated. Similarly, when a rider removes the user access point system 624 from the electric bicycle in certain embodiments, the electric bicycle computing system 610 can be configured to automatically detect that the user access point system 624 is removed and lock the electric bicycle.

Methods of Controlling Maximum Output

FIG. 7 illustrates an overview of one embodiment of a method of controlling the maximum output of a motor of an electric bicycle. In some embodiments, a user and/or rider inputs or selects via a user access point system a jurisdiction where the electric bicycle is located at block 644. In certain embodiments, the user access point system is configured to display only certain jurisdictions, such as certain states and/or countries. In other embodiments, the system is configured to automatically detect the jurisdiction.

In certain embodiments, the electric bicycle computing system communicates with a main computing system and/or other database(s) for any regulation updates at block 646. In some embodiments, the main computing system communicates with one or more regulations databases 650 to obtain the most recent regulations. In certain embodiments, the user access point system only communicates with the main computing system for updates only when necessary or periodically at predetermined intervals. In other embodiments, the user access point system does not communicate with the main computing system for updates.

In some embodiments, the user access point system determines the maximum speed and/or power output allowed for an electric bicycle under the updated, if any, regulations of the selected jurisdiction at block 652. An electric bicycle computing system in certain embodiments can limit the maximum speed and/or power of the electric bicycle according to the determined legal limits at block 654.

In certain embodiments, the user access point system displays the set maximum power and/or speed to the rider at block 656 for confirmation. If the rider confirms, then the maximum speed and/or power output of the electric bicycle is set to the maximum level allowable under that jurisdiction's regulations. In some embodiments, the user access point system is configured to display to the rider or user an option to even lower the maximum power and/or speed of the electric bicycle below the jurisdiction's legal limits at block 658. For example, a parent may decide to further limit the maximum power and/or speed of a child's electric bicycle.

In some embodiments, if a rider or user selects a lower maximum speed and/or power limit of the electric bicycle at block 658, the electric bicycle computing can then limit such to the selected level at block 660. In certain embodiments, the user access point system confirms the lower maximum speed and/or power value selected at block 662.

Downshifting and/or Stopping Event

In some embodiments, an ideal automatic transmission is one that selects the optimal gear for operating conditions, regardless of user behavior. As a result of the operational mechanics of a derailleur, however, existing bicycles with derailleurs still require user pedal input to cause or enable a shift, as the design of a derailleur typically requires chain rotation to start and complete a shift. A common event for a user is a 'fast stop' during which the user both stops pedaling and fails to downshift while coming to a stop or to a speed that requires a lower gear. The user then attempts to downshift and then pedal/accelerate back to cruising speed. Derailleur-equipped bikes have historically worked very poorly in this situation, and often fail to shift, jam the chain between gears, or become damaged. During a fast stop and/or any other stopping event, it may be desirable for the user to stabilize the bicycle and/or the rider himself or herself by keeping their feet planted on the non-rotating pedals. Generally in such a situation, momentum of the bicycle would force the user's body forward. In order to resist forward momentum, the user may use the seat, handle bars, and/or the pedals. Thus, it would be desirable for the user to keep their feet on the pedals, and not rotate the pedals, while coming to a stop. Especially in a fast stop event, it could be hazardous for the pedals to rotate, because the user would be unable or less able to resist forward momentum using his or her feet, which could result in a crash.

Some embodiments disclosed herein solve these problems by, among other things, using the electric motor to rotate the drive-chain (in some embodiments, only slightly) before and/or during each shift when the pedals are not being used and the bike is not under either motor or pedal power. One or more clutches may enable this motor-driven motion of the drive chain to not affect the pedals and/or the drive wheel (e.g., by not introducing any torque into the pedals and/or the drive wheel). In embodiments described below, the electric bicycle controller 670 and/or motor module 638 and/or other computing systems may automatically determine an optimal or available time period to effect a gear change and enable an electronically operatable derailleur to shift gears automatically during the optimal time period and at an optimal speed. This allows a derailleur system to smoothly downshift and/or upshift when a person is not pedaling (or not pedaling at an optimum cadence for the shift), and in some embodiments decouples pedaling and shifting functionality, allowing for automatic transmission operation, regardless of the current user behavior. In some embodiments, a one-way freewheel clutch is used. This, in addition to various other benefits, allows the system to complete fast, multiple gear downshifts as frequently required by a user 'fast stop' and/or other situations. Particularly in a fast stop event, the available window of time to effect a downshift before the bicycle comes to a stop can be relatively short. Accordingly, it can be desirable for the system to be configured to calculate or estimate this available window of time, and operate the motor and transmission in a manner that effects the shift within this available window of time.

On a normal bicycle equipped with a derailleur, a typical 'Shift Event' is as follows: User pedals>User moves the shift lever or button>a cable or actuator moves the derailleur>the derailleur pushes the chain towards a different gear>chain jumps to that next gear.

With the automatic transmission concepts disclosed herein, one example embodiment of a shift event is as follows: Using the bike inputs or sensors of pedal cadence, rear (or powered) wheel torque, wheel speed, gear position, motor load/temp/rpm, and/or the like, a phone-based (e.g., user device-based) application and/or an onboard computing unit can be configured to select an optimum gear and/or activate automatic gear changes. When the user device and/or onboard computing unit determines there should be a shift, it in some embodiments activates the following example logic and function: If motor and/or pedals are producing torque, optimize/modulate torque output for shift>activate electric derailleur or derailleur actuator to move chain>chain jumps to next gear>return motor to torque/throttle position requested by user. If motor and/or pedals are not producing torque, rotate motor at optimal rpm for shift>optimize torque for shift>activate electric derailleur or derailleur actuator to move chain>chain jumps to next gear>end torque application/motor rotation.

In another embodiment of the automatic transmission system, the shift event may comprise additional and/or different steps. In some embodiments, control of the automatic transmission system occurs using a user device, such as, for example, an app on a smartphone. In some embodiments, control of the automatic transmission system occurs using an onboard computing unit. In some embodiments, a user device communicates with an onboard computing unit, and they work together to implement automatic shifting.

FIG. 8 is an embodiment of a process flowdiagram depicting one example method of controlling an automatic transmission system described herein. This example process includes procedures for, among other things, (1) enabling an automatic transmission to more effectively or smoothly shift a derailleur while torque is being applied to the drive wheel, and (2) enabling an automatic transmission to shift a derailleur when the drive chain and driven sprocket set would not otherwise be moving (e.g., when no torque is being applied to the drive wheel). For example, once a user starts the electric bicycle system and/or automatic transmission system and/or the electric bicycle system and/or automatic transmission system starts autonomously (i.e. at a preset time) at block 800, the system may measure a plurality of bicycle parameters, conditions, and/or statistics through one or more sensors continuously, at predetermined intervals, and/or automatically. At block 802, a pedal cadence sensor measures pedal speed. At block 804, a wheel speed sensor measures rear wheel speed, front wheel speed and/or both wheel speeds. At block 806, gear ratio sensor detects a current position (and/or a current instructed position) of a derailleur arm and/or determines a gear ratio. At block 808, a brake pressure sensor determines an amount of pressure being applied to the brakes. In some embodiments, the user may use a hand brake to apply brake pressure. At block 810, a torque sensor determines the amount of torque being applied by pedals, the pedal crank, and/or one or more motors. At block 809, an acceleration sensor determines a level and/or rate of acceleration and/or deceleration of the electric bicycle, wheels, sprocket sets, chain drives, pedals, pedal crank and/or the like. At block 811, an inclination sensor (which may be the same as the acceleration sensor, or may be a different sensor) determines an angle of inclination of the electric bicycle, seat, wheels, chain drive, sprocket sets, motor and/or the like. In various embodiments, the system may measure a plurality of additional bicycle parameters, conditions, and/or statistics through one or more additional sensors, and/or the system may measure less or different parameters, conditions, and/or statistics.

After, before, and/or concurrently with measuring the bicycle parameters, conditions, and/or statistics, a computing system, electric bicycle controller, motor control module and/or other component of the system determines whether the motor, pedals, and/or pedal crank is producing torque at block 812 based on the measured bicycle parameters, conditions, and/or statistics. In other words, the system can be configured to determine whether the pedals and/or motor are currently applying a torque or force to the driven sprocket and/or drive wheel. In some embodiments, this is detected using at least one torque sensor. In some embodiments, this is detected indirectly by comparing a present rotational velocity of the pedal crank and/or motor output shaft with a present velocity of the driven sprocket, drive wheel, drive chain, and/or the like, while taking into account any present gear ratios or mechanical advantages between these components and/or the status of any clutches functionally disposed between these components. If the computing system, electric bicycle controller, motor control module and/or other component of the system determines that torque is being produced, at block 814, the system determines whether a gear change has been requested by the user. If a gear change has been requested by the user (e.g., by the user activating a button, lever, and/or the like), beginning at block 818 the system manually and/or automatically implements a procedure for shifting gears while torque is being produced. If a gear change has not been requested by the user, the computing system, electric bicycle controller, motor control module and/or other component of the system determines whether a gear change is necessary (or desirable) at block 816. For example, the system may compare the present conditions of the bicycle (e.g., speed, acceleration, inclination, gear range, and/or the like) to values stored in a lookup table that indicate desirable gear ranges for particular conditions. If the present gear range is different than the desirable gear range indicated by the lookup table values, the system may determine that a gear change is desirable. If a gear change is not necessary or desirable at that time, the system proceeds back to block 802 and measures the plurality of bicycle statistics. If a gear change is necessary or desirable, beginning at block 818 the system manually and/or automatically implements the procedure for shifting gears while torque is being produced.

At block 818, a power control module optimizes torque output for the shift in gears by calculating an optimal torque. At block 818, the system may also determine an optimal gear change window of time to effect the shift in gears. At block 820, a communications module activates an electric derailleur module and/or a clutch actuator module configured to move the chain and/or belt. At block 822, an electronically operatable derailleur shifts gears by automatically moving the chain and/or belt to the next gear and/or the optimal gear for the gear change. In some embodiments, block 822 is performed during the optimal gear change window of time and/or at an optimal rotational speed for the shift in gears. At block 824, an automatic transmission module returns the motor to the torque requested by a user input device, such as a pedal crank and/or throttle. After, the system may return to block 802 to measure the plurality of bicycle statistics.

If the computing system, electric bicycle controller, motor control module and/or other component of the electric bicycle system determines that torque is not being produced at block 812, the system may measure the plurality of bicycle statistics beginning at block 826, similarly to as performed in blocks 802-810. As with blocks 802-810, these measurements may be performed in a different order, at different times in the process, continuously, periodically, as needed, and/or the like. Further, less, more and/or different measurements may take place. At block 826, a pedal cadence sensor measures pedal speed. At block 828, a wheel speed sensor measures rear wheel speed, front wheel speed and/or speeds of both wheels. At block 829, gear ratio sensor detects a current position (and/or a current instructed position) of a derailleur arm and/or determines a gear ratio. At block 830, a brake pressure sensor determines an amount of pressure being applied to the brakes. In some embodiments, the user may use a hand brake to apply brake pressure. At block 832, a torque sensor determines the amount of torque being applied by pedals, the pedal crank, and/or one or more motors. At block 831, an acceleration sensor determines a level and/or rate of acceleration and/or deceleration of the electric bicycle, wheels, sprocket sets, chain drives, pedals, pedal crank and/or the like. At block 833, an inclination sensor (which may be the same as the acceleration sensor, or may be a different sensor) determines an angle of inclination of the electric bicycle, seat, wheels, chain drive, sprocket sets, motor and/or the like. The system may measure a plurality of additional bicycle parameters, conditions, or statistics through one or more additional sensors.

At block 834, the computing system, electric bicycle controller, motor control module and/or other component of the electric bicycle system determines whether a stop event is detected. In some embodiments, at block 834, the computing system, electric bicycle controller, motor control module and/or other component of the electric bicycle system determines whether a downshift is necessary while the pedals, pedal crank, and/or motor is not producing torque. As used herein, the term "stop event" refers to a situation in which a stopping of the bicycle is imminent and/or at least a sufficient level of slowing of the bicycle is occurring or imminent that a downshift would be desirable before the bicycle re-accelerates, such as under motor or pedal power. For example, the system may be configured to analyze one or more sensor outputs describing a current condition of the bicycle that indicates the bicycle is relatively rapidly decelerating. For example, in some embodiments, the system can be configured to analyze a level of acceleration or deceleration detected by an accelerometer and, based on a determination that the detected level of deceleration exceeds a threshold level, determine that a stop event is occurring. For example, in some embodiments, a level of deceleration at or above 0.5 meters/sec/sec may be used as a threshold level for determining that a stop event is occurring. In some embodiments, other threshold levels may be used, such as for example, 0.1, 0.2, 0.3, 0.4, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, or 2.5 m/s/s. In some embodiments, a stop event is alternatively referred to as a fast stop, a quick stop, a quick deceleration, an emergency stop, and/or the like. It should be noted, however, that the techniques and advantages disclosed herein are not necessarily limited to situations where the bicycle is expected to come to a complete stop. For example, stop event, fast stop, and other similar terms may be used to refer to a situation where a bicycle is relatively quickly decelerating, such as because an object appeared in front of the cyclist during the ride, but that do not necessarily require a complete stop, and will result in the rider wanting to re-accelerate at some point before the bike comes to a complete stop. In that case, it may still be desirable to be in a lower gear once the deceleration completes and re-acceleration is desired, and the techniques disclosed herein would still be applicable.

If a stop event is not detected, the system returns to block 812 to determine whether the motor, pedals, and/or pedal crank is producing torque. If at block 834 a stop event is detected, at block 836, the computing system, electric bicycle controller, motor control module and/or other component of the electric bicycle system calculates an optimal (or available) gear change time window and/or shifting window to effect the shift in gears. For example, the system may analyze a current rate of deceleration and estimate from at least that current rate of deceleration how long it will be before the bicycle comes to a stop, and or how many revolutions of the drive wheel there will be until the bike comes to a stop. In some embodiments, this time before the bicycle comes to a stop may be considered the available window for effecting the gear change (see, for example, window 1140 shown in FIG. 11C). In some embodiments, however, the system may further take into account that, to effect the gear change efficiently or optimally, it may be desirable to rotate the sprocket set within a certain rotational velocity range. Further, in some embodiments, a one way freewheel clutch is disposed between the sprocket set in the drive wheel, and thus the sprocket set cannot rotate at a faster rate than the drive wheel. Accordingly, the available window in that situation may not be until the bicycle comes to a stop, but rather a shorter window that ends at the estimated time when the drive wheel will drop to or below a speed within or below the range of the desired rotational velocity for effecting the gear shift (see, for example, shortened available window 1141 shown in FIG. 11C).

The range of the desired rotational velocity of the driven sprocket set for effecting the gear shift may be directly or indirectly dependent on one or more factors including but not limited to: gear ratios, gear sizes, the slope or incline of the road and/or surface, wind conditions, weather conditions, the user's physical attributes, derailleur arm speed, chain load, and/or the like. Accordingly, the optimal range of the desired rotational velocity for effecting the gear shift may vary.

In some embodiments, it is desirable to effect the shift as quickly as possible, and thus the desired rotational speed of the driven sprocket during shifting of the chain from one gear to another is equal to the current drive wheel speed. In that case, it can be desirable to continually monitor the wheel speed during the gear change and dynamically increase or decrease the motor speed to ensure the driven sprocket remains at a speed as close to the current wheel speed as possible, but without introducing any new torque or power into the wheel, or with introducing as little new torque or power into the wheel as possible. In some embodiments, it is desirable to maintain the driven sprocket speed to within 5% of the current wheel speed during the shift. In other embodiments, this threshold level may be different, such as, for example, 1%, 2%, 3%, 4%, 10%, 15%, 20%, or 25%. Embodiments including a one-way freewheel clutch may allow the chain to be under at least a slight and/or lower load, which may assist the system and/or derailleur to effect the gear shift. In some embodiments including a one-way free wheel clutch system, there may be no maximum limit of the optimal sprocket set speed and/or velocity. Only certain bicycle parameters, conditions, and/or statistics may have an upper limit, such as the wheel speed.

In some embodiments including an active clutch system, where the sprocket set speed is faster than the wheel speed, a maximum optimal sprocket speed may be determined and/or calculated. In particular, in such arrangements, a range of the desired rotational velocity of the driven sprocket set of 60-65 revolutions/minute may be used for effecting the gear shift. In some embodiments, other ranges of desired rotational velocity may be used, such as for example, 0-5, 5-10, 10-15, 15-20, 20-25, 25-30, 30-35, 35-40, 45-50, 50-55, 55-60, 65-70, 70-75, 75-80, 80-85, 85-90, 90-95, 95-100, 100-105, 105-110, 110-115, 115-120, 120-125, 125-130, 130-135, 135-140, 140-145, 145-150, 150-155, 155-160, 160-165, 165-170, 170-175, 175-180, 180-185, 185-190, 190-195, 195-200, 200-205 revolutions/minute, or other higher ranges, and any combination of these ranges.

As disclosed herein, effecting such a shift using an electronically controllable motor and/or derailleur, along with using one or more sensors to detect current bicycle parameters, can provide a large benefit over a human manually effecting a shift. In a case where a bicycle has a manually operated derailleur and manually operated chain drive, such as through a pedal crank, it would be impossible for a human to continually monitor the wheel speed and ensure the driven sprocket remains at an optimum speed equal to that wheel speed or slightly below that wheel speed at all times without introducing any new torque or power into the wheel. In some embodiments, the automatic transmission systems disclosed herein are capable of achieving the maximum possible speed of effecting a gear change (i.e. in the minimum possible time) without introducing new power or torque into the drive wheel in any given situation. In some embodiments, this maximum possible speed is limited only by the current wheel speed. In some embodiments, this maximum possible speed may be lower than the current wheel speed, due to taking into account other factors that may cause, for example, the chain to jam or cause other problems due to too fast of a gear change. These are also the type of factors that would be impossible for a human to analyze in real time to maintain the maximum speed of shifting while maintaining a stable and/or reliable shift.

At block 838, the electric bicycle controller, motor control module and/or other component of the electric bicycle system calculates an optimal gear change speed and/or optimal gear change torque to apply when rotating the motor for effecting a shift in gears. For example, calculating the optimal gear change speed may begin with retrieving from a lookup table a desired or optimal rotational velocity at which to rotate the driven sprocket set for changing between a specific gear to another specific gear, and/or for changing gears in general. That optimal gear change speed may then be adjusted up or down based on current conditions of the bicycle and/or the stop event. For example, the system may further calculate or estimate the amount of rotation, such as the number of degrees of rotation of the drive sprocket required to affect the shift. In some embodiments, the electric bicycle controller, motor control module and/or other component of the electric bicycle system calculates an optimal speed of a derailleur arm for effecting a shift in gears. The system may also or alternatively determine and/or calculate the speed of the derailleur arm in relation to the speed of the driven sprocket set. In some embodiments, the driven sprocket set may be rotating at a higher speed, so the system may increase the speed of the derailleur arm. In some embodiments, the driven sprocket set may be rotating at a slower speed, so the system may decrease the speed of the derailleur arm. In some embodiments, the system may automatically and/or manually adjust the speed of the derailleur arm to match the speed of the driven sprocket set.

The system may then calculate how long the shift will take based on the desired speed and the required amount of rotation. If the shift will take longer than the determined shifting window, such as due to a relatively high rate of deceleration, the system can be configured to increase the desired gear change speed to ensure the gear change completes before the bicycle stops. Further, in some embodiments, the system may be configured to continually monitor the rate of deceleration during the gear change, and increase the rotational speed of the sprocket set in the middle of the gear change based on a determination that the bicycle deceleration has increased and shortened the available window for shifting a gear.

In some embodiments, the system is configured to include a margin or a safety margin in the estimated window of time for effecting the shift, and thus to operate the driven sprocket at a speed to effect the shift before the end of the stop event by at least that margin. Such a margin can be desirable, for example, to help deal with a situation where the deceleration of the bicycle unexpectedly increases and thus shortens the available window for the shift. Further, in some embodiments, the system is configured to wait until an end of the available shifting window is approaching before initiating the shift. This can be desirable in some embodiments, for example, because in some cases a stop event may be detected by the system, but the user or rider may decide to reaccelerate the bicycle earlier than expected, such as before coming to a complete stop. In that case, if the bicycle has not yet decelerated significantly, it may be desirable to still be in the original gear instead of having already downshifted. Accordingly, in some embodiments it can be desirable to time the downshift to happen during a later portion of the available gear shifting window, such as in the last 50% of the available gear shifting window. In other embodiments, it can be desirable to time the downshift to happen during an even later portion of the available gear shifting window, such as in the last 60, 70, 80, or 90% of the available gear shifting window. One potential effect of forcing the gear shifting event or downshift to occur later in the available window is that the rotational speed of the driven sprocket for effecting the shift may need to be increased. Accordingly, how late in the available window the shift begins may be at least partially dependent on a desired maximum rotational speed of the driven sprocket for effecting the shift. That desired maximum rotational speed of the driven sprocket may be based, at least partially, on a speed at which a jamming of the drive chain may be expected to occur, and/or a speed at which damage to the components may be anticipated due to the high speed.

At block 840, a power control module optimizes a torque output for the shift in gears and/or rotates the motor to cause the driven sprocket set to be rotated at the calculated optimal RPM and/or torque for the shift. At block 842, a communications module activates an electric derailleur module and/or a clutch actuator module configured to move the chain and/or belt. At block 844, an electronically operatable derailleur shifts gears by automatically moving the chain and/or belt to the next gear and/or the optimal gear for the gear change while the driven sprocket is being caused to rotate by the motor. In some embodiments, block 844 is performed during the optimal gear change window of time and/or at an optimal rotational speed for the shift in gears. At block 846, once the system effects the shift in gears, the motor is stopped (assuming the user is not indicating he or she desires motor torque to be applied to the wheel) and the system returns to block 802 to measure the plurality of bicycle parameters, conditions, and/or statistics.

As described above, some embodiments of electric bicycles having an automatic derailleur transmission comprise a jackshaft design, similar to as illustrated in FIGS. 1-2, that may comprise a pedal system engaged via a one-way freewheel (clutch) either at the jackshaft input or at a pedal hub. In some embodiments, the clutch is automatic, without requiring active engagement or disengagement by the user device or onboard computing unit. As described above, in other embodiments, the clutch is configured to be selectively engaged and/or disengaged as needed by the user device and/or onboard computing unit.

One such embodiment of a jackshaft design with an automatic derailleur transmission is illustrated in FIGS. 9A and 9B. In this embodiment, a motor 212 drives a jackshaft 900 via chain or belt 912, the jackshaft 900 drives the driven sprocket set 902 via chain 906, and the sprocket set 902 then causes the rear wheel 908 to rotate. Alternatively and/or concurrently, the pedals 108 cause pedal crank 916 to rotate, which drives the jackshaft 900 via chain or belt 914, which drives the sprocket set 902. The pedal system in some embodiments is engaged via a one-way freewheel (clutch) 910 either at the jackshaft input or at pedal hub. The one-way clutch allows the motor 212 to drive the chain without creating movement at the pedals 108, so the control system can effect a gear change without turning the pedals 108. As discussed above, this can be desirable, particularly in a fast stop, when the rider needs to use the pedals 108 to help stabilize himself or herself and counteract forward momentum. This is even more desirable in an electric bicycle situation, since the electric bicycle may be heavier and harder to stabilize in a fast stop than a traditional non-electric bicycle. In some embodiments, the clutch 910 is automatic, without requiring active engagement or disengagement by the user device or onboard computing unit. In other embodiments, the clutch 910 is configured to be selectively engaged and/or disengaged as needed by the user device and/or onboard computing unit. In some embodiments, the system may further comprise a separate clutch that enables decoupling of the motor from the jackshaft, thus enabling the user to pedal the bicycle without rotating the motor.

FIG. 9A illustrates a situation in which the rider is operating the bicycle in a pedal-assist mode, meaning the driven sprocket set 902 is receiving power from the jackshaft 900 that is a combination of power output by both the motor 212 and the pedal crank. In this embodiment, while the user is pedaling, a torque is applied on the pedal crank 916. As a result, belt or chain 914 can be rotated in a clockwise direction. Motor 212 may spin in a clockwise direction, turning chain or belt 912 in a clockwise direction. Thus, in this embodiment, the sum of the driving forces points along belt or chain 906 and rotates belt or chain 106 in a clockwise direction.

FIG. 9B illustrates a situation in which no torque is being applied to the pedals 108 and/or pedal crank 916, but the motor 212 is still causing the jackshaft 900 and thus the driven sprocket 902 to rotate. This may occur in at least two situations. First, the driven sprocket 902 may be introducing power to the wheel 908, thus causing the bicycle to accelerate, or at least maintain a speed. Second, the driven sprocket 902 may not be introducing power to the wheel 908 (e.g., by turning slower than the wheel or otherwise being decoupled rotationally from the wheel) and the rotation caused by the motor 212 may be to effect a gear change. For example, once a computing system, electric bicycle controller, and/or motor control module detects a stop event or determines that a downshift is necessary while no torque is being applied, the computing system, electric bicycle controller, and/or motor control module operates the motor 212 at an optimal time and optimal speed for shifting gears to effect a gear change. At this time, belt or chain 914 is not rotating. Thus, only motor 212 applies torque to rotate belt or chain 912 and belt or chain 906 and an electronically controllable actuator 903 moves the electrically operatable derailleur 904 to effect a change in gears.

In some embodiments, the automatic derailleur transmission concepts disclosed herein can be configured to work with any electric motor arrangement, such as a 'mid-drive' bike configuration as described above, and as depicted in FIGS. 10A and 10B, where the motor 212 is not mounted in the wheel (e.g., where there is at least one belt, chain, and/or the like that is used to transfer torque from the motor to the driven or powered wheel). Instead, an electric bicycle may comprise a mid-drive motor 212 positioned at a bottom bracket. Clutch 910 in this embodiment may be a one-way freewheel, magnetic or other electrically controlled mechanical clutch that is used to disconnect the pedals from the front sprocket 420 when a user stops pedaling. In this embodiment, the electric motor drives the front sprocket 420 to create required chain movement during the shift event (as opposed to driving a jackshaft).

Similar to FIG. 9A, FIG. 10A illustrates an embodiment of an automatic derailleur transmission comprising a mid-drive motor design in which the user may operate the electric bicycle by applying torque using pedals 108, motor 212 and/or both the pedals 108 and motor 212 at the same time. In an embodiment, while the user is pedaling, a torque is applied on the pedal crank 916. As a result, belt or chain 906 can be rotated in a clockwise direction. Motor 212 may spin in a clockwise direction (or otherwise, depending on its installation orientation and/or any gearing arrangement), also turning chain or belt 906 in a clockwise direction. Thus, in the embodiment shown in FIG. 10A, the sum of the driving forces points along belt or chain 906 and rotates belt or chain 906 in a clockwise direction.

Figure 11A:
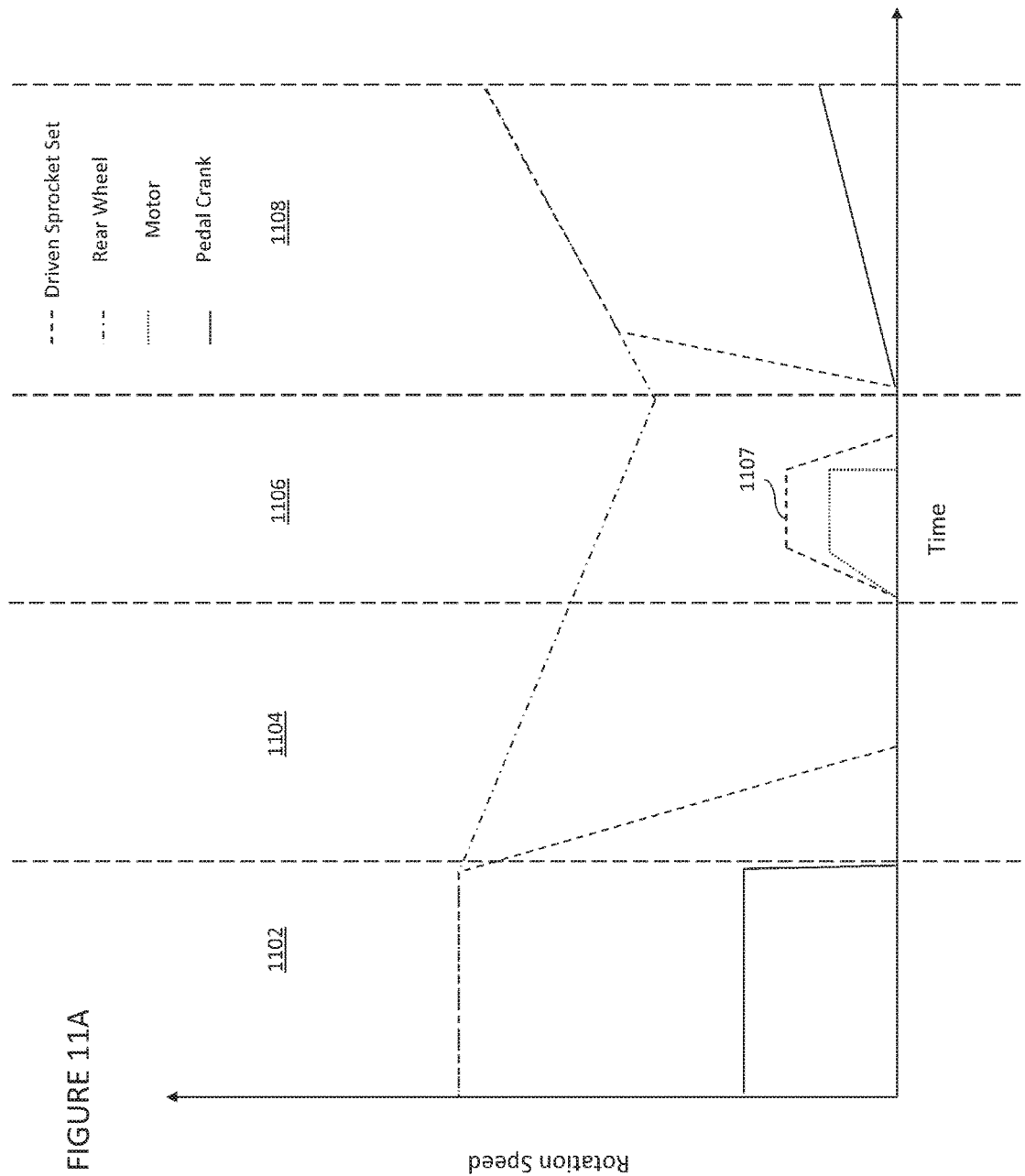
Figure 11B:
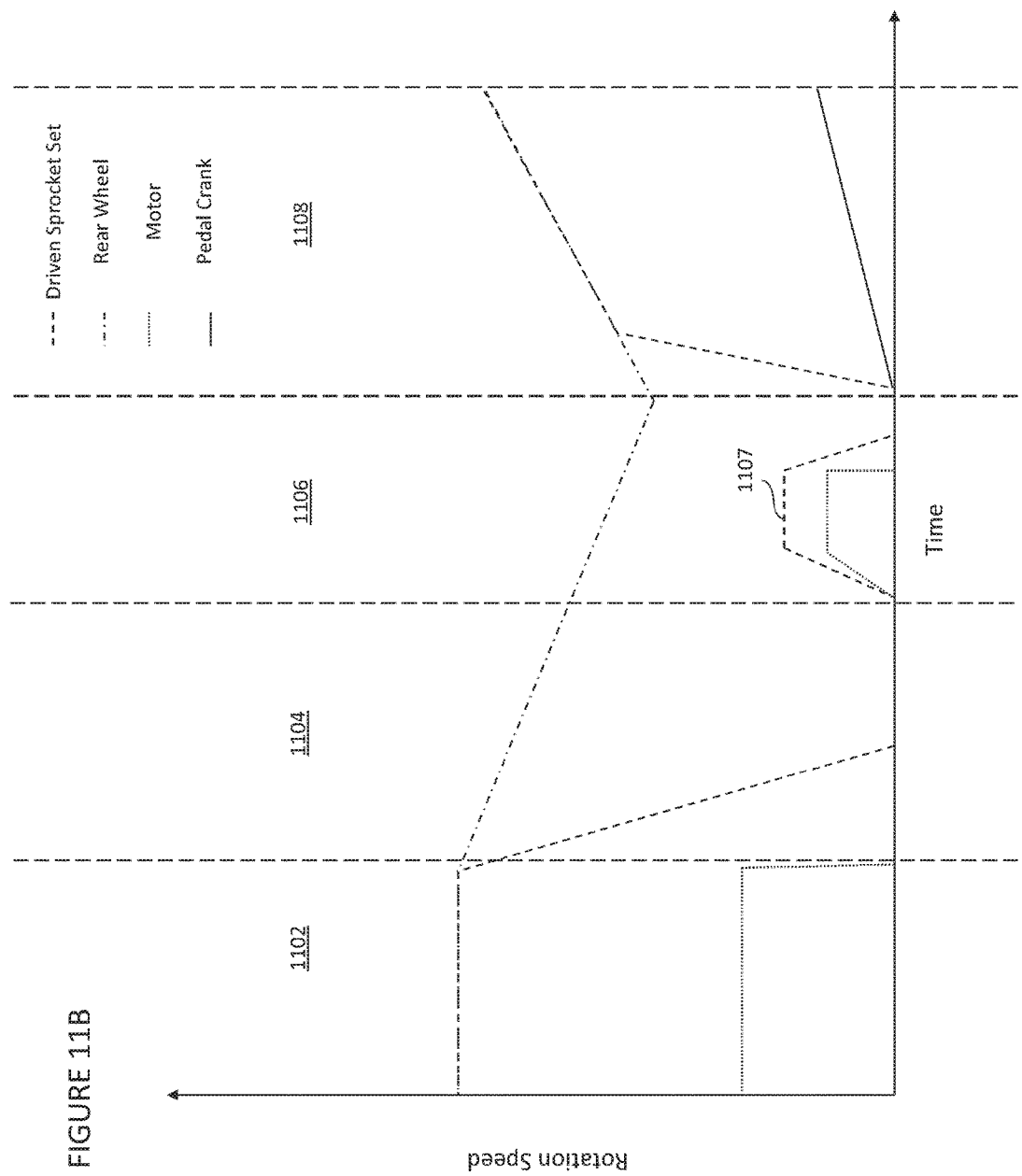

FIG. 10B illustrates an embodiment of an automatic derailleur transmission comprising a mid-drive motor design in which no torque is being applied to the pedals 108 and/or pedal crank 916. Once a computing system, electric bicycle controller, and/or motor control module detects a stop event or determines that a downshift is necessary while no torque is being applied, the computing system, electric bicycle controller, and/or motor control module operates the motor 212 at an optimal time and optimal speed for shifting gears to effect a gear change. In an arrangement, the electrically controlled mechanical clutch 910 is used to disconnect the pedals from the front sprocket 420 when a user stops pedaling. In some arrangements, a one-way freewheel clutch could be used. Thus, only motor 212 applies torque to rotate belt or chain 906 and an electronically controllable actuator 903 moves the electrically operatable derailleur 904 to effect a change in gears FIGS. 11A-11C are line graphs depicting embodiments of methods for controlling various components of an electric bicycle. In particular, FIGS. 11A-11C illustrate line graphs depicting embodiments of methods for controlling an automatic derailleur transmission system. In the line graphs, the "dash-dot" lines represent a rear wheel, the "short-dash" lines represent a sprocket set and/or a chain, the "solid" line represents a user input device, such as a pedal crank, and the "dotted" lines represent a motor. The graphs of FIGS. 11A-11C are not drawn to scale and are primarily intended to depict relationships between the various components.

FIG. 11A depicts an example wherein the electric bicycle is being operated in pedal-only mode, the rider stops pedaling, thus causing the bicycle to slow down, the motor is used to effect a downshift, and the rider then begins pedaling again. In FIG. 11A, at section 1102, a wheel speed, sprocket set and/or chain speed, and a pedal crank speed are all constant, indicating the user is pedaling at a rate sufficient to keep the bicycle at a constant speed. The wheel speed and sprocket set and/or chain speed are equal, though the pedal crank speed is lower, indicating the bicycle may currently be in a relatively high gear. At section 1104, the user stops applying a force and/or torque to the pedal crank. As a result, the pedal crank speed is equal to zero and the sprocket set and/or chain speed rapidly decreases (or in some embodiments may decrease at a same or similar rate as the pedal crank). During this time, the bicycle is coasting, so the rear wheel speed gradually slows down.

At section 1106, the system determines that a downshift should occur, based on, for example, a determination that a stop event is occurring, as discussed above. The rear wheel speed continues to slow down, but the sprocket set and/or chain speed is too slow to effect a gear change (in this case, because the sprocket set speed is zero, although it could also be at some speed greater than zero but still less than a desirable gear change speed in some embodiments). In order to effect a gear change, the computing system, electric bicycle controller, and/or electric motor module may calculate a rate of deceleration (for example, as indicated by the slope of the rear wheel speed line). Based on the rate of deceleration, the computing system, electric bicycle controller, and/or electric motor module may estimate an optimal window of time to effect a gear change. Depending on the length of the optimal window, the computing system, electric bicycle controller, and/or electric motor module calculates an optimal speed to rotate the motor to drive the sprocket fast enough to reach an optimal sprocket set speed and effect the gear change, but still keeping the sprocket set speed slower than the rear wheel speed (so as to not cause acceleration). In some embodiments, the computing system, electric bicycle controller, and/or electric motor module calculates a certain number of degrees of rotation depending on a plurality of bicycle statistics, such as a gear ratio, measured by a plurality of sensors.

With continuing reference to section 1106, the computing system, electric bicycle controller, and/or electric motor module operates the motor at an optimal speed, and activates the electrically operatable derailleur to effect the gear change within the calculated optimal window. Thus, as illustrated, the motor speed increases until it reaches an optimal speed causing the sprocket set and/or chain to increase to an optimal speed 1107 during the calculated optimal window. At that time, the electrically operatable derailleur effects the gear change. After, the motor is turned off causing the sprocket set and/or chain speed to decrease. At section 1108, after the downshift has occurred, but before the bicycle comes to a complete stop, the user begins pedaling again, causing the pedal crank speed to increase and thus the sprocket set and/or chain speed and rear wheel speed to also increase.

FIG. 11B depicts an example similar to 11A, but wherein the electric bicycle is being operated in a motor-only mode, instead of a pedal-only mode. When the motor stops introducing torque (e.g., in response to a rider letting off the throttle) at section 1104, the bicycle slows down. As with FIG. 11A, the motor is used to effect a downshift in section 1106 while the bicycle is still decelerating, and without introducing torque into the rear wheel. At section 1108, the motor begins applying torque to the wheel again, such as in response to the rider opening the throttle. Although FIGS. 11A and 11B depict pedal-only and motor-only modes, respectively, in other embodiments, the user may apply a force and/or a torque to the pedal crank and use the motor at the same time, and the same concepts will apply.

FIG. 11C depicts another example similar to FIG. 11A, but in this case, the electric bicycle system is experiencing a "fast stop" as described above, wherein the bicycle is relatively quickly coming to a complete stop. Similar to embodiments previously disclosed, at section 1132, a wheel speed, sprocket set and/or chain speed, and a pedal crank speed are all constant. At section 1132, the wheel speed and sprocket set and/or chain speed are equal. At section 1134, the user stops applying a force and/or torque to the pedal crank and applies a pressure to the brakes causing the bicycle to rapidly slow down. As a result, the pedal crank speed is equal to zero and the sprocket set and/or chain speed rapidly decreases. During this time, the rear wheel speed also rapidly decreases.

Similar to the embodiments described herein, at section 1136, the computing system, electric bicycle controller, and/or electric motor module calculates an optimal speed to turn the motor and an optimal window to effect a gear change. Also, computing system, electric bicycle controller, and/or electric motor module operates the motor at the optimal speed, and activates the electrically operatable derailleur to effect the gear change within the calculated optimal window. Thus, as illustrated, the motor speed increases rapidly until it reaches an optimal speed causing the sprocket set and/or chain to increase to an optimal speed 1137, less than the rear wheel speed, during the calculated optimal window. At that time, the electrically operatable derailleur effects the gear change. After, the motor is turned off causing the sprocket set and/or chain speed to decrease.

In yet other embodiments, the system can allow a user to downshift while the bicycle is not moving. In some embodiments, the electric bicycle system comprises an active clutch configured to decouple or at least partially decouple the pedal crank from the derailleur sprocket to enable the motor (and/or the momentum of the bicycle) to turn the derailleur sprocket at a faster speed than it would be turned by the pedal crank in the current gear alone. When the electric bicycle is stopped, the active clutch may decouple the pedal crank from the derailleur sprocket or sprocket set. In an embodiment, a one-way freewheel clutch coupled to the rear wheel may also decouple the rear wheel from the derailleur sprocket or sprocket set. Once the pedal crank and/or rear wheel is decoupled, a computing system, electric bicycle controller, and/or motor control module may operate the motor to spin the derailleur sprocket at an optimal speed for shifting gears and activate an electric derailleur configured for shifting gears. In some embodiments, the electric derailleur shifts gears and the computing system, electric bicycle controller, and/or motor control module stops the spinning of the motor. In yet another embodiment, a shifting mechanism that does not require rotation of the driven sprocket set and chain to effect a shift may be used, instead of a derailleur. For example, the automatic transmission system may be configured to use a mechanism that is configured to lift the chain off of one sprocket, move the chain over similar to what a derailleur would do, and then set the chain back down on a different sprocket. Such functionality would be one alternative way of enabling a shift while a bicycle is stationary.

Shock Linkage

In an embodiment, the rear wheel suspension of the electric bicycle uses shock linkage instead of direct shock. By using a shock linkage instead of a direct shock it is possible to withstand a wide range of loads by making slight adjustments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

Although the embodiments of the inventions have been disclosed in the context of a certain preferred embodiments and examples, it will be understood by those skilled in the art that the present inventions extend beyond the specifically disclosed embodiments to other alternative embodiments and/or uses of the inventions and obvious modifications and equivalents thereof. In addition, while a number of variations of the inventions have been shown and described in detail, other modifications, which are within the scope of the inventions, will be readily apparent to those of skill in the art based upon this disclosure. It is also contemplated that various combinations or subcombinations of the specific features and aspects of the embodiments may be made and still fall within one or more of the inventions. Accordingly, it should be understood that various features and aspects of the disclosed embodiments can be combine with or substituted for one another in order to form varying modes of the disclosed inventions. Thus, it is intended that the scope of the present inventions herein disclosed should not be limited by the particular disclosed embodiments described above.

What is claimed is:

1. A derailleur-based electronic transmission system for an electric bicycle, the system comprising:
   a wheel;
   a driven sprocket set coupled to the wheel via at least a first one-way clutch, the driven sprocket set comprising two or more concentric sprockets of different effective diameters;
   a drive chain configured to engage the driven sprocket set;
   an electronically controllable derailleur configured to move the drive chain among the two or more sprockets;
   a pedal crank configured to cause rotation of the driven sprocket set by providing a user pedal force to the driven sprocket set through at least a second one-way clutch and the drive chain;
   a motor configured to cause rotation of the driven sprocket set by providing an electromechanical force to the driven sprocket set through at least a the drive chain; and
   an electronic controller configured to, responsive to a determination that a shift should occur at a time when neither the pedal crank nor the motor is causing rotation of the driven sprocket:
      operate the motor to rotate the driven sprocket at a rotational speed less than or equal to a current rotational speed of the wheel; and
      operate the derailleur to cause the shift to occur while the driven sprocket is being rotated by the motor.

2. The derailleur-based electronic transmission system of claim 1, wherein the motor is further configured to provide the electromechanical force to the driven sprocket set through at least a third one-way clutch and the drive chain.

3. The derailleur-based electronic transmission system of claim 1, wherein the electronic controller is configured to determine that the shift should occur by determining that a stop event is occurring.

4. The derailleur-based electronic transmission system of claim 3, wherein determining that the stop event is occurring comprises monitoring, directly and/or indirectly, one or more of the following: a rotational speed of the wheel, a rotational speed of the pedal crank, a rate of deceleration of the rotational speed of the wheel, a braking force, a rate of translational deceleration, a pedal cadence.

5. The derailleur-based electronic transmission system of claim 3, wherein the electronic controller is further configured to:
   estimate a remaining amount of revolutions of the wheel before the stop event completes; and
   operate the motor to rotate the driven sprocket at a rotational speed less than or equal to the current rotational speed of the wheel, but sufficiently fast to complete the shift within the estimated remaining amount of revolutions of the wheel.

6. The derailleur-based electronic transmission system of claim 1, further comprising:
   a jackshaft configured to transfer the user pedal force and electromechanical force to the driven sprocket through at least the drive chain,
   wherein the pedal crank and motor are each connected to the jackshaft through a separate chain or belt different than the drive chain.

7. The derailleur-based electronic transmission system of claim 6, wherein the second one-way clutch is located functionally between the pedal crank and the jackshaft.

8. The derailleur-based electronic transmission system of claim 6, wherein the third one-way clutch is located functionally between the motor and the jackshaft.

9. The derailleur-based electronic transmission system of claim 1, wherein the motor, pedal crank, and driven sprocket are arranged in a mid-drive arrangement.

10. The derailleur-based electronic transmission system of claim 1, wherein the electronic controller is further configured to:
monitor the rotational speed of the wheel as the shift is occurring; and
adjust the operation of the motor, responsive to a determination that the rotational speed of the wheel has changed, to increase or decrease the rotational speed of the driven sprocket to maintain the rotational speed of the driven sprocket at a speed less than or equal to the rotational speed of the wheel.

11. The derailleur-based electronic transmission system of claim 10, wherein the electronic controller is configured to maintain the rotational speed of the driven sprocket to within 5% of the monitored rotational speed of the wheel as the shift is occurring.

12. A method of automatically operating a derailleur-based transmission of an electric bicycle, the method comprising:
determining, by an electric bicycle controller, that a stop event is occurring;
determining, by the electric bicycle controller, that a downshift is desirable before the stop event completes;
measuring, directly or indirectly, a rotational sprocket set speed and determining that the rotational sprocket set speed is below a threshold speed for effecting the downshift before the stop event completes, the sprocket set comprising two or more concentric sprockets;
operating, by the electric bicycle controller, a motor to cause rotation of the sprocket set at a speed equal to or greater than the threshold speed, but equal to or less than a rotational speed of a wheel coupled to the sprocket set; and
operating, by the electric bicycle controller, an electronic derailleur to cause the electronic derailleur to shift a chain from a first sprocket of the two or more concentric sprockets to a different sprocket of the two or more concentric sprockets while the motor is causing the sprocket set to rotate.

13. The method of claim 12, wherein determining that the stop event is occurring comprises monitoring, directly or indirectly, by one or more sensors, one or more of the following bicycle conditions: a rotational speed of the wheel, a rotational speed of a pedal crank, a rate of deceleration of the rotational speed of the wheel, a braking force, a rate of translational deceleration, a pedal cadence.

14. The method of claim 12, wherein determining that the stop event is occurring further comprises determining that the rate of deceleration of the rotational speed of the wheel is equal to or greater than a threshold rate of deceleration.

15. The method of claim 14, wherein the threshold rate of deceleration is at least 0.5 meters/sec/sec.

16. The method of claim 12, further comprising:
calculating the threshold speed for effecting the downshift before the stop event completes, the calculating comprising:
detecting a current gear status;
determining an amount of sprocket set rotation required to effect a shift from the current gear to an optimum starting gear; and
calculating a minimum sprocket set rotational speed required to effect the required amount of sprocket set rotation before the stop event completes.

17. The method of claim 16, wherein the calculating the threshold speed further comprises:
determining an optimum gear change sprocket set speed range; and
responsive to determining that the minimum sprocket set rotational speed required to effect the required amount of sprocket set rotation before the stop event completes is below the optimum gear change sprocket set speed range, setting the threshold speed to be at least as fast as a bottom end of the optimum gear change sprocket set speed range.

18. The method of claim 12, further comprising:
continually monitoring, directly and/or indirectly, the rotational speed of the wheel during the shift of the chain; and
reducing the rotational speed of the sprocket set as needed, during the shift of the chain, to maintain the rotational speed of the sprocket set equal to or less than the rotational speed of the wheel.

19. The method of claim 18, further comprising increasing the rotational speed of the sprocket set, during the shift of the chain, in response to a determination that the rotational speed of the wheel has increased during the shift of the chain.

20. A computer-readable, non-transitory storage medium having a computer program stored thereon for causing a suitably programmed computer system to process by one or more processors computer-program code by performing a method for automatically operating a derailleur-based transmission of an electric bicycle when the computer program is executed on the suitably programmed computer system, the method comprising:
determining, using a computer system, that a stop event is occurring;
determining, by the computer system, that a downshift is desirable before the stop event completes;
measuring, directly or indirectly, a rotational sprocket set speed and determining that the rotational sprocket set speed is below a threshold speed for effecting the downshift before the stop event completes, the sprocket set comprising two or more concentric sprockets;
operating, using the computer system, a motor to cause rotation of the sprocket set at a speed equal to or greater than the threshold speed, but equal to or less than a rotational speed of a wheel coupled to the sprocket set; and
operating, using the computer system, an electronic derailleur to cause the electronic derailleur to shift a chain from a first sprocket of the two or more concentric sprockets to a different sprocket of the two or more concentric sprockets while the motor is causing the sprocket set to rotate;
wherein the computer system comprises a computer processor and electronic memory.

* * * * *